(12) United States Patent
Rimmelspacher et al.

(10) Patent No.: US 9,855,803 B2
(45) Date of Patent: Jan. 2, 2018

(54) TRAILER COUPLING AND LOAD CARRIER ARRANGEMENT FOR A TRAILER COUPLING

(71) Applicant: Scambia Holdings Cyprus Limited, Limassol (CY)

(72) Inventors: Bernhard Rimmelspacher, Rheinstetten (DE); Wolfgang Gentner, Steinheim (DE); Aleksej Kadnikov, Leonberg (DE)

(73) Assignee: Scambia Holdings Cyprus Limited, Limassol (CY)

( * ) Notice: Subject to any disclaimer, the term of this patent is extended or adjusted under 35 U.S.C. 154(b) by 0 days.

(21) Appl. No.: 14/753,598

(22) Filed: Jun. 29, 2015

(65) Prior Publication Data

US 2015/0375585 A1 Dec. 31, 2015
US 2016/0243907 A2 Aug. 25, 2016

Related U.S. Application Data

(63) Continuation-in-part of application No. 14/162,070, filed on Jan. 23, 2014.

(30) Foreign Application Priority Data

Jan. 25, 2013 (DE) .......................... 10 2013 100 780
Jun. 30, 2014 (DE) .......................... 10 2014 109 134

(51) Int. Cl.
*B60D 1/06* (2006.01)
*B60R 9/10* (2006.01)
(Continued)

(52) U.S. Cl.
CPC ............... *B60D 1/065* (2013.01); *B60D 1/56* (2013.01); *B60R 9/06* (2013.01); *B60R 9/10* (2013.01)

(58) Field of Classification Search
CPC .. B60D 1/065; B60D 1/56; B60R 9/06; B60R 9/10
(Continued)

(56) References Cited

U.S. PATENT DOCUMENTS 2,523,500 A 9/1950 Davey et al.
4,209,184 A 6/1980 Byers
(Continued)

FOREIGN PATENT DOCUMENTS

DE 9305689 U1 8/1993
DE 4315292 A1 11/1994
(Continued)

*Primary Examiner* — Joseph M Rocca
*Assistant Examiner* — Felicia L. Brittman
(74) *Attorney, Agent, or Firm* — Reinhart Boerner Van Deuren P.C.

(57) ABSTRACT

In order to improve a trailer coupling for motor vehicles, including a ball neck which is mountable on a rear part of a motor vehicle so as to be fixed to the vehicle by means of a ball neck carrier by way of a first end and on a second end carries a coupling ball, in such a manner that load carriers can be mounted and held securely in a simple manner, it is proposed that, for positioning a load carrier holding device, which is loadable onto the coupling ball and the ball neck, at least one first positioning body is arranged on the ball neck at a defined spacing from the coupling ball, that the at least one first positioning body is arranged on a ball neck portion of the ball neck which adjoins a ball attachment of the ball neck which carries the coupling ball and in particular, proceeding from the ball attachment, extends along the ball neck over a distance which corresponds to a maximum of one and a half times the diameter of the coupling ball, and that the at least one first positioning body extends transversely with respect to a development of the ball neck portion which carries said positioning body and away from said ball neck portion.

29 Claims, 23 Drawing Sheets

(51) Int. Cl.
  *B60D 1/56*  (2006.01)
  *B60R 9/06*  (2006.01)
(58) Field of Classification Search
  USPC .......................................................... 280/513
  See application file for complete search history.

(56) References Cited

U.S. PATENT DOCUMENTS

| | | |
|---|---|---|
| 2005/0205629 A1 | 9/2005 | Wang |
| 2007/0187448 A1 | 8/2007 | Dongiovanni et al. |
| 2014/0210186 A1 | 7/2014 | Kadnikov et al. |

FOREIGN PATENT DOCUMENTS

| | | | |
|---|---|---|---|
| DE | 202005011444 U1 | 12/2006 | |
| DE | 102008009150 A1 | 9/2009 | |
| DE | 202010007974 U1 | 1/2011 | |
| DE | 102011004653 A1 | 8/2011 | |
| DE | 102013100780 A1 | 7/2014 | |
| EP | 1184212 A2 | 3/2002 | |
| EP | 2258567 A1 | 12/2010 | |
| EP | 2361808 A2 | 8/2011 | |
| EP | 2759421 A2 | 7/2014 | |
| NL | EP 2258567 A1 * | 12/2010 | ............. B60D 1/065 |
| WO | WO 82/00119 | 1/1982 | |

* cited by examiner

TRAILER COUPLING AND LOAD CARRIER ARRANGEMENT FOR A TRAILER COUPLING

CROSS-REFERENCE TO RELATED PATENT APPLICATION

This patent application claims the benefit of German application No. 10 2014 109 134.5, filed Jun. 30, 2014, the teachings and disclosure of which are hereby incorporated in their entirety by reference thereto.

BACKGROUND OF THE INVENTION

The invention relates to a trailer coupling for motor vehicles including a ball neck which is mountable on a rear part of a motor vehicle so as to be fixed to the vehicle by means of a ball neck carrier by way of a first end and on a second end carries a coupling ball.

These types of trailer couplings are known from the prior art.

These types of trailer couplings primarily serve for the purpose of attaching a trailer which cooperates by way of a tow ball coupling with the coupling ball.

In many cases, however, a trailer coupling also serves for the purpose of mounting a load carrier, for example for bicycles or skis or other sports equipment in order to be able to transport them in a simple manner.

Consequently, the object underlying the invention is to improve a trailer coupling of the type described in the introduction in such a manner that load carriers are able to be mounted and held securely in a simple manner.

SUMMARY OF THE INVENTION

Said object is achieved according to the invention in the case of a trailer coupling of the type described in the introduction as a result of, for positioning a load carrier holding device, which is loadable onto the coupling ball and the ball neck, at least one first positioning body being arranged on the ball neck at a defined spacing from the coupling ball, the at least one first positioning body being arranged on a ball neck portion of the ball neck which adjoins a ball attachment piece of the ball neck which carries the coupling ball and in particular, proceeding from the ball attachment, extends along the ball neck over a distance which corresponds to a maximum of one and a half times the diameter of the coupling ball, and the at least one first positioning body extending transversely with respect to a development of the ball neck portion which carries said positioning body and away from said ball neck portion.

This means that proceeding from a development of the ball neck or of the ball neck portion, the first positioning body rests thereon or protrudes therefrom or surrounds the ball neck portion entirely or in part.

The arrangement of the first positioning body additionally has the advantage that it is consequently possible, in the case of very many shapes of the ball neck, to arrange the first positioning body always at the same defined spacing from the coupling ball and extensively independently of the shape of the ball neck, in particular of an offset thereof, and to maintain a standardized position of the first positioning body relative to the coupling ball.

The advantage of the solution according to the invention, in this case, can be seen in that a first positioning body of this type is able to position the load carrier holding device in a simple manner and relative to the ball neck, that means to align it and to hold it in the aligned position.

In particular, in this case, the positioning of the load carrier holding device is also effected as a result of said load carrier holding device being supported on the coupling ball such that, in this case, the positioning of the load carrier holding device is effected, on the one hand, by means of supporting on the coupling ball and, on the other hand, by means of supporting on the first positioning body.

In this case, the at least one first positioning body can be a separate body which is connected to the ball neck portion by means of mounting elements or is held on the ball neck portion as a result of a positive-locking fit.

However, it is also conceivable for the at least one positioning body to be integrally moulded on the ball neck portion, for example integrally moulded in one piece, for example as an accumulation of material or a thickening.

With regard to the realization of the at least one first positioning body, it is particularly favourable when the at least one first positioning body carries at least one first positioning surface, by means of which a positioning of the load carrier holding device can be effected.

For example, it is provided for this purpose that the at least one first positioning surface lies outside a projection contour of the coupling ball which is generated as a result of the projection of the coupling ball onto the first positioning body, wherein in particular the projection contour intersects the at least one first positioning body.

The projection of the coupling ball on the positioning body is preferably effected parallel to a loading direction along which the load carrier holding device is movable in order to place said load carrier holding device onto the coupling ball and the ball neck.

In particular, the loading direction runs approximately parallel to a ball centre axis of the coupling ball and of the ball attachment, an approximately parallel development of the loading direction with respect to the ball centre axis being understood as the angle between the ball centre axis and the loading direction being equal or less than 20°, preferably equal or less than 10°, even better equal or less than 5°, a simply designable solution providing a parallel development.

In addition, it is preferably provided that the loading direction runs parallel to a longitudinal centre plane of the ball neck and/or parallel to a cross plane which is aligned perpendicularly to a longitudinal centre plane of the ball neck.

This means that the first positioning surface is arranged in each case at such a spacing from the ball neck or the ball neck portion that it lies outside the projection contour of the coupling ball on the positioning body and consequently in a simple manner is available for positioning the load carrier holding device when the load carrier holding device is placed onto the coupling ball, this means engages over or engages around the coupling ball in order to be supported on the coupling ball.

In particular, it is consequently possible to realize the load carrier holding device in such a manner that a ball receiving means can be placed onto the coupling ball or engages around said coupling ball and at the same time, without impairing the access to the ball receiving means, interaction with the positioning surfaces of the positioning body is possible in order to support the load carrier holding device on the at least one positioning surface of the positioning body.

No more details have been given in conjunction with the previous explanation of the individual embodiments with regard to the realization of the positioning surface.

Thus, a particularly favourable solution provides that the at least one first positioning surface comprises at least one guide surface region which runs parallel to a loading direction of the load carrier holding device.

In addition, no more details have been given in conjunction with the previous explanation of the individual embodiments concerning the arrangement of the at least one first positioning surface on the first positioning body.

Thus, it would be conceivable for the first positioning surface to be arranged in an interior of the first positioning body, for example in a bore or in an interior space that is surrounded at least in part by the positioning body.

An advantageous solution provides that the at least one first positioning surface is arranged on an outside surface of the first positioning body such that, as a result, a simple interaction with the positioning surface is possible.

It is particularly favourable in this case when the first positioning body is realized as a closed body, preferably as a solid body.

In conjunction with the previous explanations of the individual embodiments, it has been assumed that at least one first positioning body is arranged on the ball neck portion.

Improved positioning or sturdier positioning of the load carrier holding device, however, is possible as a result of a positioning body being arranged in each case on the ball neck portion on sides of said ball neck portion that are located opposite one another such that the support of the load carrier holding device can be effected by means of two first positioning bodies.

For example, it would be conceivable to arrange the first positioning bodies on oppositely situated sides in a longitudinal centre plane of the ball neck.

As an alternative to this, however, it is also conceivable to arrange the first positioning bodies on the ball neck on oppositely situated sides of a cross plane of the ball neck which runs transversely, in particular perpendicularly, to the longitudinal centre plane.

In particular, it is favourable when, in an operating position of the ball neck, the first positioning bodies are arranged on oppositely situated sides of a longitudinal centre plane of the trailer coupling, in the operating position of the ball neck the longitudinal centre plane of the trailer coupling also coinciding with a longitudinal centre plane of the motor vehicle body and in particular with the longitudinal centre plane of the ball neck.

In this case, the first positioning bodies could also still be arranged on the ball neck offset with respect to one another in a direction parallel to the longitudinal centre plane.

Thus, a particularly favourable solution provides that the first positioning bodies lie in the same cross plane which runs transversely, in particular perpendicularly, to the longitudinal centre plane and in particular approximately parallel to the centre axis of the coupling ball.

Particularly favourable is a solution where the first positioning bodies are arranged in a mirror-symmetrical manner to the longitudinal centre plane of the ball neck and consequently are arranged on both sides of the longitudinal centre plane in exactly the same relative position with respect to the coupling ball, as the coupling ball is already realized in a mirror-symmetrical manner to the longitudinal centre plane.

No more details have been given in conjunction with the previous description of the individual exemplary embodiments with regard to the functioning of the first positioning bodies.

Another advantageous solution, however, provides that the at least one first positioning body serves not only for the defined alignment of the load carrier holding device relative to the ball neck and to the coupling ball, but at the same time also receives the carrying load such that the coupling ball, in this case, does not contribute to carrying the load carrier holding device but, interacting with the load carrier holding device, only to holding the load carrier holding device aligned in a defined manner with respect to the ball neck.

No further details have been given up to now either with regard to the arrangement or the development of the at least one first positioning surface. Thus, for example, the first positioning surfaces could comprise a different symmetry relative to the longitudinal centre plane or no symmetry relative to the longitudinal centre plane.

However, a particularly expedient solution provides that the at least one first positioning surface of the first positioning body is realized in a mirror-symmetrical manner with respect to the longitudinal centre plane of the ball neck such that the positioning surfaces themselves also have a mirror symmetry to the longitudinal centre plane.

No further details have been given up to now with regard to the realization and form of the at least one first positioning body itself.

Thus, a particularly favourable solution provides that, proceeding from a ball neck portion carrying said first positioning body, the at least one first positioning body extends away from the ball neck portion in a direction of extension.

This is a simple and expedient development of the positioning body which facilitates support of the load carrier holding device on said positioning body.

For example, it would be possible in this conjunction to realize the at least one first positioning body such that said at least one first positioning body extends in a kind of branching of the ball neck or in a kind of forming of the ball neck.

A particularly simple form of realization provides that the direction of extension of the at least one first positioning body runs transversely with respect to the ball neck portion carrying said positioning body.

In addition, no details with regard to the development of the first positioning surface relative to the direction of extension have been given either in the case of a first positioning body of this type.

Thus, an advantageous solution provides that the at least one first positioning surface extends parallel to the direction of extension or at an angle of less than 30°, or even better less than 20°, with respect to the direction of extension of the positioning body.

In this case it is provided, for example, that the at least one positioning surface is a surface region of a geometrical surface which intersects the ball neck portion carrying the positioning body, that is extends transversely with respect to said ball neck portion.

The most varied possibilities are conceivable with regard to the arrangement of the positioning surfaces on the positioning body.

For example, it is provided in this case that the at least one first positioning body comprises first positioning surfaces which are arranged on oppositely situated sides.

In particular, in this case, the first positioning surfaces which are arranged on oppositely situated sides are realized such that they lie on opposite sides of a cross plane which extends transversely, in particular perpendicularly, with respect to the longitudinal centre plane.

The first positioning surfaces are preferably also realized such that they extend in a mirror-symmetrical manner with respect to the cross plane.

Guide surface regions, which are to extend parallel to the loading direction, have been described in the case of a previously mentioned exemplary embodiment in conjunction with the functioning of the positioning surfaces.

However, as an alternative to this or in addition to it, it is also conceivable for the at least one first positioning surface to comprise at least one positioning surface region which runs transversely with respect to the loading direction.

In addition, it is possible in the case of such positioning surface regions which extend transversely with respect to the loading direction to arrange two positioning surface regions which extend transversely with respect to the loading direction such that they are spaced apart relative to one another at a spacing which increases or decreases as the extension increases in the loading direction, this means that the first positioning surface regions can develop a wedge-like action together in order to achieve exact positioning thereon.

In this case, the two first positioning surface regions can extend relative to one another in a conical or parabolic or hyperbolical manner or in the form of cylinder or ball surface regions.

In addition, it is expedient when such first positioning surface regions extend symmetrically with respect to the loading direction such that exact positioning which is symmetrical to the loading direction is realizable.

Only at least one first positioning surface has been disclosed in connection with the exemplary embodiments described up to now.

In order to achieve as secure positioning of a load carrier holding device as possible, it is preferably provided that at least one second positioning surface, which runs transversely with respect to the first positioning surface, is arranged on the ball neck.

In this case, the at least one second positioning surface can be arranged in a fundamentally arbitrary manner on the ball neck.

It is particularly favourable when the at least one second positioning surface is arranged on a ball neck portion of the ball neck which adjoins a ball attachment of the ball neck carrying the coupling ball and in particular carries the first positioning body.

The at least one second positioning surface is arranged, for example, on the first positioning body such that the first positioning body carries both the first positioning surface and the second positioning surface.

Another advantageous solution provides that the at least one second positioning surface is arranged on a second positioning body.

In this case, the second positioning body can be arranged connected to the first positioning body or it is provided in an advantageous manner that the second positioning body is arranged at a spacing from the first positioning body.

A further advantageous solution provides that the at least one second positioning surface lies outside a projection contour of the coupling ball which is generated as a result of the projection of the coupling ball onto the positioning body carrying the respective second positioning surface, in particular the projection contour intersecting the respective positioning body.

This means that the second positioning surface also lies outside said projection contour, in the same manner as the first positioning surface.

It would be conceivable, for example, even to provide the second positioning surface radially outside the first positioning surface.

Another advantageous solution provides that the at least one second positioning surface lies inside a projection contour of the coupling ball which is generated as a result of the projection of the coupling ball onto the positioning body carrying the at least one second positioning surface, in particular the projection contour intersecting the respective positioning body.

As an alternative to the realization of the positioning body in such a manner that said positioning body extends in a direction of extension, it is provided that the first positioning body is formed by a receiving body which sits on the ball neck portion carrying the positioning body, such a receiving body being formed by an accumulation of material arranged on the ball neck portion.

In a special case, it is, for example, conceivable to realize the first positioning body by a collar which is formed on the ball neck portion carrying said first positioning body.

In this case, it is preferably provided that the at least one first positioning surface lies on an outside surface of the first positioning body remote from the ball neck portion.

Consequently, it is provided, for example, that the at least one positioning surface is arranged on one side of the longitudinal centre plane of the ball neck.

It is provided, for example, in this case that the at least one positioning surface has a development which deviates from a rotationally symmetrical development with respect to the centre axis of the coupling ball.

This is realizable in a particularly simple manner when the at least one first positioning surface includes a flattening of the positioning body.

In particular, this can be realized as a result of the at least one first positioning surface lying in a geometric surface which does not intersect the ball neck portion carrying the first positioning body.

A particularly favourable development provides that two first positioning bodies are provided on the ball neck and that the at least one first positioning surface of the one positioning body comprises a surface portion which lies in a geometric plane which, together with the geometric plane in which a surface portion of the at least one positioning surface of the other positioning body lies, encloses an angle of less than 120°.

The angle is preferably less than 100°, even better less than 90°.

No further details have been given up to now with regard to the positioning surfaces themselves.

In particular when the positioning body is integrally formed in one piece on the ball neck, it is advantageous when the positioning surfaces are machined surfaces in order to be able to secure the position and alignment thereof relative to the coupling ball in an exact manner.

Over and above this, according to the invention, the object named in the introduction is also achieved according to the invention by a load carrier arrangement for a trailer coupling which comprises a ball neck and a coupling ball, in particular for a trailer coupling according to one or more of the above-described features, in that the load carrier holding device includes a housing body with a ball receiving means for the coupling ball of the ball neck of the trailer coupling and that the load carrier holding device includes at least one position receiving element which is fixedly connected to the housing body and interacts with the positioning body which is arranged on the ball neck.

The advantage of the solution according to the invention is consequently in that in contrast to the known load carrier holding devices where the housing body is fixed to the coupling ball itself, for example by means of a clamping device, as a result of the interaction between the at least one position receiving element and the positioning body it is possible to achieve better and more precise alignment of the load carrier holding device relative to the ball neck and to the coupling ball, in particular the position receiving element and the positioning body achieving defined and additional support of the load carrier holding device on the ball neck with the coupling ball.

The advantage of the solution according to the invention is additionally to be seen in this case in that it is consequently possible to connect the load carrier holding device to the ball neck carrying the coupling ball and to produce a sturdy and secure connection between the same on the one hand in a simple manner and on the other hand in as sturdy a manner as possible.

In particular, the interaction between the position receiving element and the positioning body is effected so as to form a positive-locking fit.

In particular, it is provided in this case that the position receiving element interacts with the positioning body, in particular so as to form a positive-locking fit, in such a manner that the housing body is secured relative to the ball neck against tilting movements about tilt axes which extend transversely, in particular perpendicularly, with respect to the centre axis of the coupling ball.

Consequently, all tilting movements of the housing body can be eliminated by the position receiving element and the positioning body.

As an alternative to this or in addition to it, it is provided that the positioning body and the position receiving element interact in such a manner, in particular so as to form a positive-locking fit, that the housing body is secured in a non-rotatable manner against a rotational movement about a rotational axis which is parallel to the centre axis of the coupling ball or encloses a maximum angle of 20° with the centre axis of the coupling ball.

Consequently, it is also possible to secure said housing body on the ball neck against rotational movements about the rotational axis in a simple manner as a result of the interaction between the positioning body and the position receiving element.

It is particularly favourable in this case when the position receiving element interacts in a clamping-free manner with the position body, this means that the interaction is not effected by means of a clamping connection but simply by means of a positive-locking interaction the tilting movements about the tilt axes and/or the rotational movements about the possible rotational axes are eliminated simply by positive locking without clamping between the position receiving element and the positioning body being necessary.

In particular, in this case, the position receiving element is realized such that it comprises at least one receiving surface which interacts with the at least one positioning surface of the at least one positioning body in a load carrier holding position.

As a result of placing the receiving surface on the positioning surface, the positive locking fixings against movements about the tilt axis and/or rotations about the rotational axis can be eliminated.

An advantageous solution in this case provides that two position receiving elements are fixedly connected to the housing body.

In this case, it is preferably provided that the two position receiving elements are arranged in a rigid manner relative to one another.

In addition, it is preferably provided that the two position receiving elements are arranged rigidly relative to the housing body.

It is particularly favourable when the position receiving element comprises two receiving surfaces which face one another.

In principle, it would be conceivable to realize the positioning bodies such that they hold, but do not carry, the load carrier holding device relative to the ball neck in a definably aligned position such that, for example, the load carrier holding device rests on the coupling ball and is carried by the coupling ball and the positioning bodies limit non-fixed degrees of freedom of movement of the load carrier holding device relative to the coupling ball and to the ball neck to a defined alignment of the load carrier holding device as a result of the load carrier holding device being carried by the coupling ball.

The interaction of the positioning body with the position receiving element has not been specified in more detail in connection with the previous solutions.

It is preferably provided that the respective positioning body is arranged with its region carrying the positioning surface between the receiving surfaces of the position receiving element in a load carrier holding position.

It is particularly advantageous when the position receiving element comprises receiving surfaces which extend facing one another, between which the positioning body is arranged in the load carrier holding position.

Over and above this, it is preferably provided that the position receiving element comprises two guide surface regions which face one another and extend approximately parallel to the loading direction.

These types of guide surface regions enable the load carrier holding device to be secured in a non-rotatable manner on the ball neck by means of the positioning body and the position receiving element.

In this case, it is provided, for example, that the alignment surface, in particular the guide surface regions, guide the respective positioning body with a small amount of play in the load carrier holding position.

In order also to be able to support the position receiving element on the positioning bodies, it is preferably provided that at least one of the receiving surfaces comprises a support surface region which extends transversely relative to the loading direction.

A support surface region of this type creates the possibility of also transferring the load from the load carrier holding device to the ball neck by means of the positioning body.

It is particularly favourable when each of the receiving surfaces comprises a support surface region which extends transversely relative to the loading direction.

It is favourable in particular when the support surface regions extend apart from one another at a spacing which increases as the extension in the loading direction increases such that the support surface regions are not only able to be used for the purpose of supporting the load carrier holding device on the positioning body, but also for aligning it in a defined manner relative to the positioning body.

The support surface regions, in this case, can extend in a conical or parabolic or cylindrical or tapered manner with respect to one another.

An advantageous solution provides that the support surface regions extend in a curved manner with respect to one another, for example in the form of parabolic arcs or circular arcs or hyperbolic arcs.

A particularly advantageous solution provides that the support surface regions secure the stabilizing element relative to the positioning body with a small amount of play in the load carrier position.

No further details have been given up to now with regard to the arrangement of the stabilizing element and of the position receiving element.

Thus, a structurally favourable solution provides that the at least one position receiving element lies on one side of the ball neck when the load carrier holding device is arranged on the ball neck in the load carrier holding position.

Another expedient solution, in particular a solution where the positioning surfaces essentially comprise guide surface regions, provides that the two positioning bodies lie with their positioning surfaces between the receiving surfaces of two position receiving elements.

In the case of this solution, it is consequently possible, by moving the load carrier holding device in the loading direction and placing the same onto the ball neck with the coupling ball, to move the receiving surfaces into interaction with the positioning surfaces by the housing body with the position receiving elements simply being placed in the loading direction onto the coupling ball and the ball neck with the positioning body without further movements of the load carrier holding device being necessary for this purpose.

This solution is particularly favourable also when the two positioning surfaces of the two positioning bodies and/or the two receiving surfaces of the two receiving bodies comprise surface portions, in particular wedge surface portions, which extend in a widening or narrowing manner in a wedge direction which extends transversely with respect to the loading direction as the extension in the wedge direction increases.

Consequently, it is possible, as a result of a movement transversely with respect to the loading direction in the wedge direction, to move the position receiving elements relative to the positioning bodies so as to abut against one another and to wedge them together in order to achieve, as a result, positioning of the position receiving elements relative to the positioning bodies on the ball neck with a small amount of play and consequently also to be able to position the housing body overall with a small amount of play or in a substantially play-free manner relative to the ball neck with the positioning bodies.

Only details of how the load carrier holding device is positionable relative to the ball neck have been given in connection with the previous description of the load carrier holding device.

However, no statements concerning the fixing of the load carrier holding device on the ball neck have been given.

Thus, an advantageous solution provides that the load carrier holding device comprises a fixing device which secures the housing body on the ball neck.

A fixing device of this type preferably comprises a fixing element which fixes the housing body relative to the ball neck in the load carrier holding position.

In this case, the fixing elements can become effective in different ways.

A expedient solution provides that the fixing element interacts with the coupling ball or the ball neck in such a manner that the housing body is acted upon with a fixing force in the loading direction or counter to the loading direction relative to the coupling ball or to the ball neck and consequently does not move away from the ball neck in the opposite direction to the loading direction.

In particular, in this case, the loading force is always effective as long as the load carrier holding device is in the load carrier holding position and the fixing element is in the fixing position.

A further advantageous solution provides that the fixing element interacts with the coupling ball or the ball neck in such a manner that the housing body experiences a clamping force which is directed transversely with respect to the loading direction relative to the coupling ball or to the ball neck, and play between the coupling ball receiving means and the coupling ball and/or between the positioning body and the position receiving element is reduced or removed.

In particular, in this case, the clamping force is always effective as long as the load carrier holding device is in the load carrier holding position and the fixing element is in the fixing position.

The generating of the loading direction and/or of the clamping force is effected in particular as a result of interaction between the fixing element and a surface which extends obliquely or in a curved manner with respect to the loading direction on the coupling ball or the ball neck, it being possible for the surface to be arranged directly on the ball neck or on a body resting on the ball neck, for example on the positioning body.

A first advantageous solution in this case provides that the fixing element cooperates with the positioning body in a fixing position and consequently the load carrier holding device is also fixed on the ball neck by means of the positioning body.

This can be realized in particular as a result of the fixing element engaging behind the at least one positioning body on a front side in the loading direction and as a result being capable of acting upon the load carrier holding device in the direction of the loading direction.

However, it is also conceivable for the fixing element to cooperate with a different point on the ball neck with the coupling ball, for example with a nose or indentation specifically provided for this purpose on the ball neck.

An advantageous solution provides that the fixing element cooperates with the ball neck or with the coupling ball in a fixing position.

This is also realizable in particular as a result of the fixing element engaging behind an undercut on the ball neck or engaging into an indentation on the ball neck or engaging behind the coupling ball on a front side, that means on a bottom side when the loading direction is vertical from top to bottom.

Such cooperation with the ball neck or with the coupling ball in the fixing position can be realized in particular as a result of the fixing element projecting into a ball receiving means of the housing body in the fixing position.

In order to be able to move the fixing element between a fixing position and a release position, it is preferably provided that the fixing element is guided so as to be movable in a guide channel between the fixing position and the release position.

The guide channel is realized as a guide bore of the housing body in the case of a particularly simple solution.

The guide channel, in this case, preferably extends transversely with respect to the ball receiving means of the housing body such that the fixing element is able to be positioned in a simple manner in the fixing position so as to project into the ball receiving means of the housing body or to be pulled out of said ball receiving means in the release position.

No further details concerning the method of operation of the fixing element have been given in connection with the previous embodiments.

Thus, an advantageous solution provides that the fixing element is movable in a guide direction between a release position and a fixing position and that the fixing element is movable in the guide direction by means of an actuating device.

The fixing element, in this case, can be movable in the most varied manner.

An advantageous solution provides that the fixing element is guided so as to be movable in a guide channel between the fixing position and the release position.

The guide channel can be arranged in the most varied manner.

An advantageous solution provides that the guide channel runs transversely with respect to the ball receiving means.

In this case, the fixing element can be realized in the most varied manner.

A realization provides that the fixing element is realized as a fixing screw.

Another solution provides that the fixing element is realized as a fixing body, for example as a fixing ball.

A further solution provides that the fixing element is realized as a fixing journal.

A further solution provides that the fixing element is realized as a fixing bracket which is fittable, for example, on the coupling ball and includes said coupling ball at least in part.

A further advantageous solution provides that the fixing element is realized as a fixing finger which is movable transversely, preferably radially with respect to the centre axis and is fittable, for example, on the coupling ball.

A further solution for an actuating device provides that the actuating device comprises a toggle lever drive for moving the fixing element between the release position and the fixing position.

In this case, the toggle lever drive is preferably in an above dead centre position in the fixing position and holds the fixing element in its fixing position.

As a result, it is possible to operate the load carrier holding device in a simplified manner when removing it.

Further features and advantages of the invention are the object of the following description and of the drawing of a few exemplary embodiments.

DETAILED DESCRIPTION OF THE INVENTION

Figure 1:
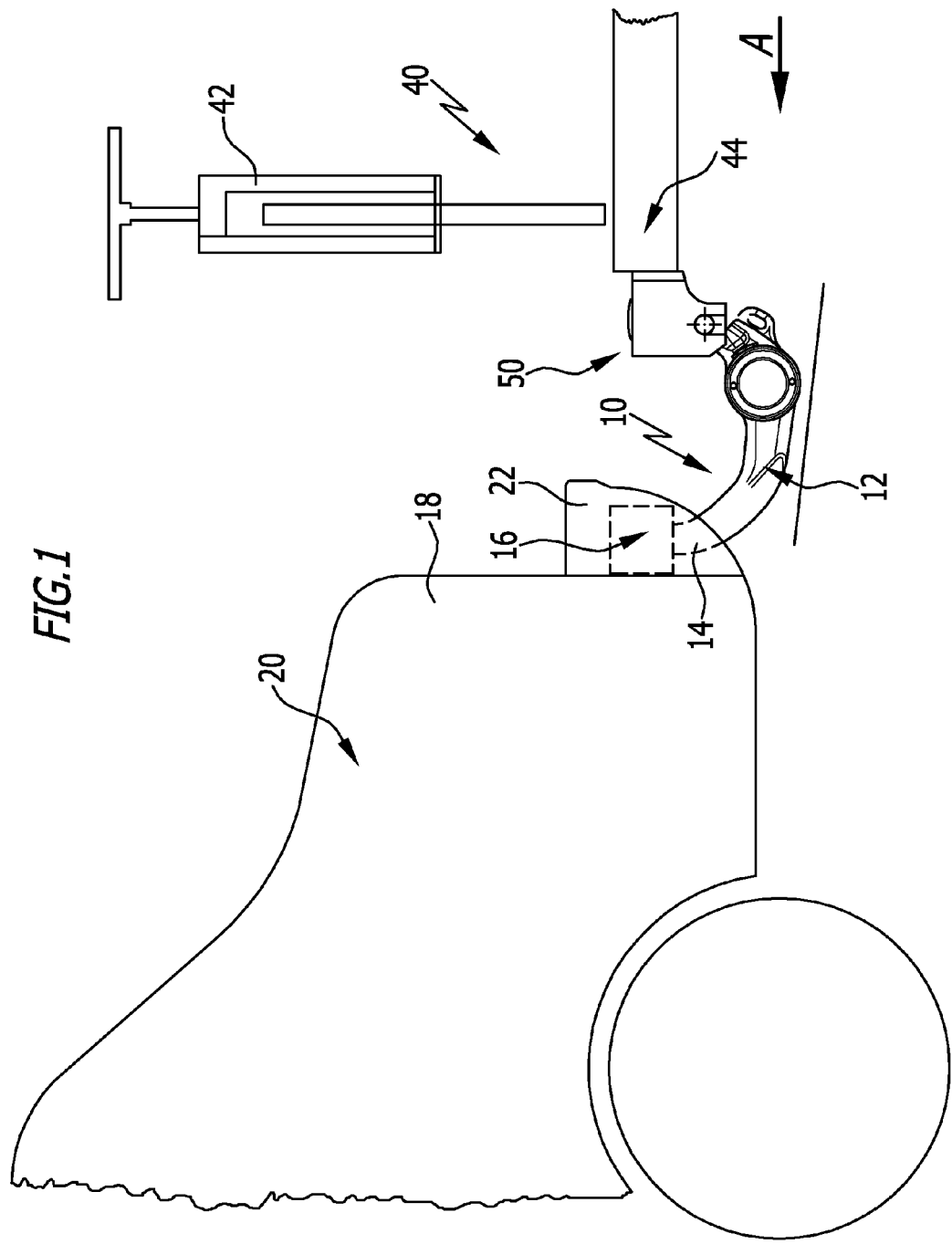
FIG. 1 shows a side view of a motor vehicle, in particular of a passenger vehicle with a trailer coupling which is in an operating position and a load carrier unit which is held on the trailer coupling.
Figure 2:
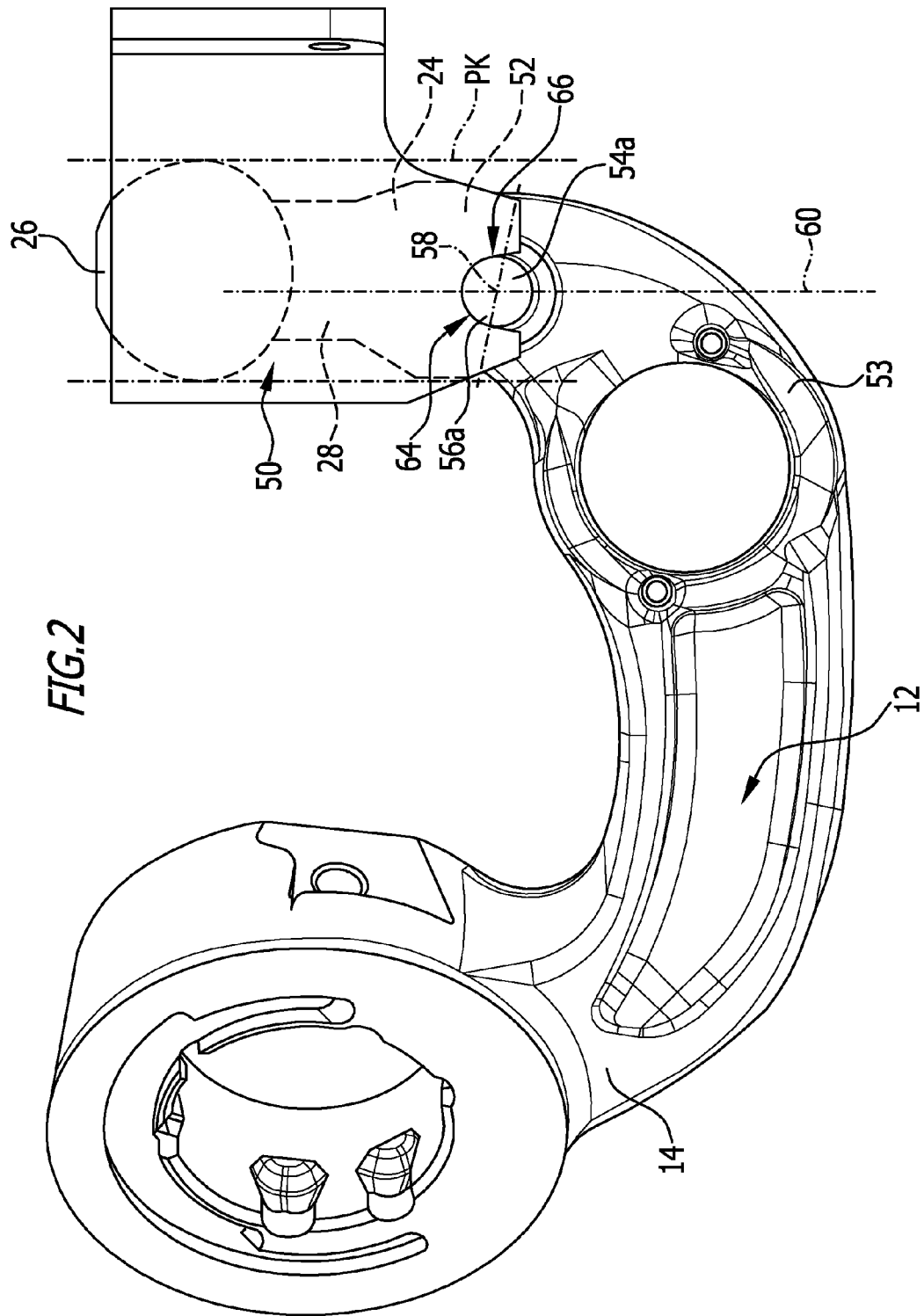
FIG. 2 shows a view similar to FIG. 1 with part of a ball neck of the trailer coupling shown in an enlarged manner and a first embodiment of a load carrier holding device which is fixed on the trailer coupling in the fixed position.

An exemplary embodiment shown in FIGS. 1 and 2 of a trailer coupling given the overall reference of 10 includes a ball neck 12 which is connected at a first end 14 to a ball neck carrier 16 which, in turn, is held fixedly on a rear part 18 of a motor vehicle body of a motor vehicle which is given the overall reference of 20, the ball neck carrier 16 being connected to the rear part 18 preferably concealed by a rear bumper unit 22.

The ball neck carrier 16 can include, for example, a cross carrier which usually extends below the bumper unit 22, parallel to said bumper unit and transversely with respect to a longitudinal direction of the motor vehicle body 20 and is connected, in turn, to the rear part 18, and in addition either a receiving means, on which the ball neck 12 is held fixedly or releasably by way of the end 14, or a pivot bearing, by way of which the ball neck 12 is pivotable about one or several axes relative to the rear part 18 between an operating position, shown in FIG. 1, and a rest position which is not shown, the ball neck 12 extending in the rest position approximately parallel to the bumper unit 22 and being arranged, extensively concealed by the rear bumper unit 22, between said rear bumper unit and the rear part 18 of the motor vehicle body 20.

Figure 3:
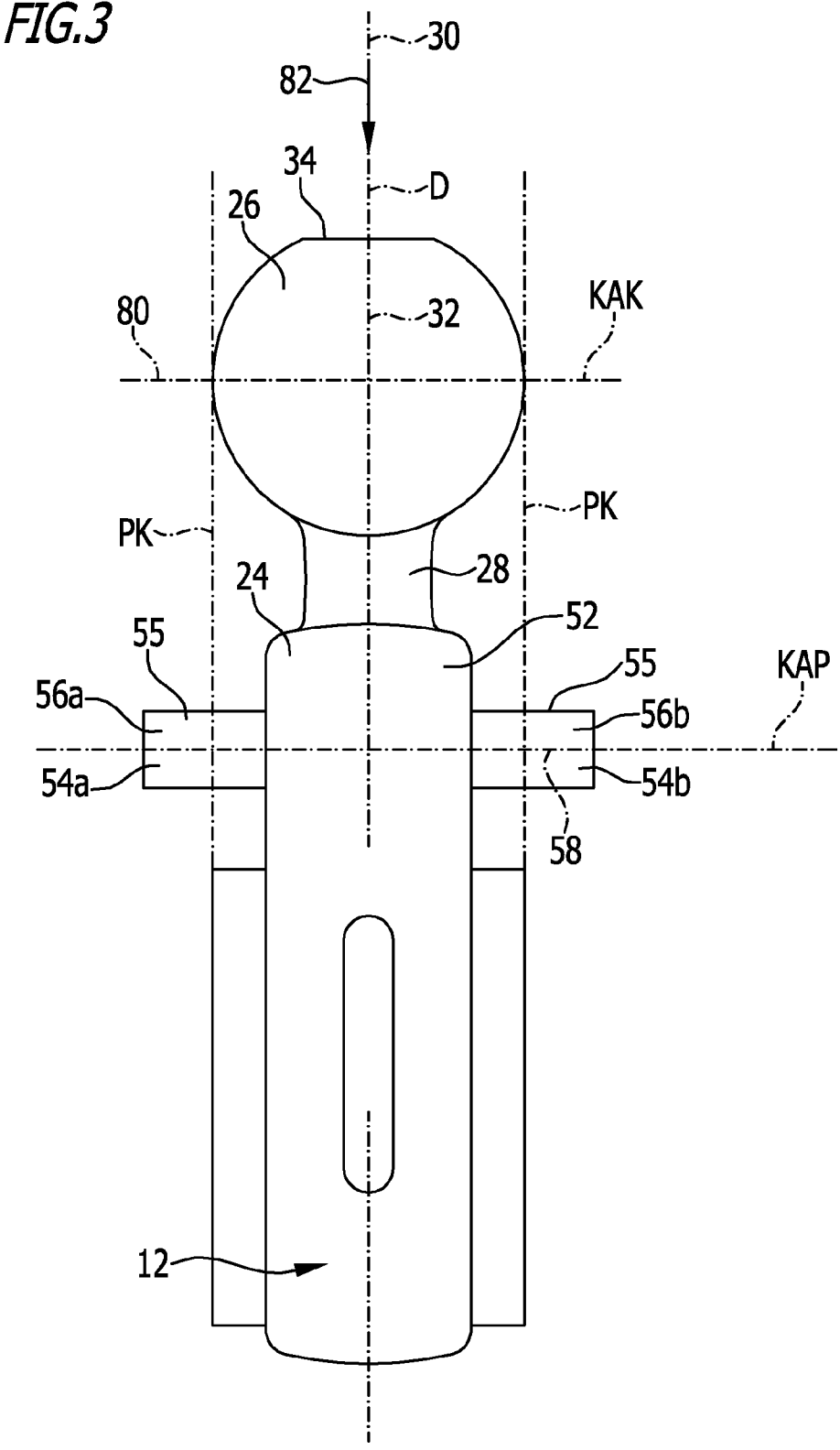
FIG. 3 shows a top view in the direction of an arrow A in FIG. 1 of a first exemplary embodiment of the ball neck without a load carrier holding device having being placed onto the ball neck.

As is shown in FIG. 2 and FIG. 3, the ball neck 12 is contoured between its first end 14 and the second end 24, which is opposite said first end, such that the end 24 extends away from a travel path in the operating position, and carries a coupling ball, which is given the overall reference of 26, a constriction, which is designated as a ball attachment 28 which connects to the end 24 in continuation of a development of the ball neck 12 and by means of which the coupling ball 26 is connected to the second end 24 of the ball neck 12, being provided between the coupling ball 26 and the end 24.

The coupling ball 26, in this case, usually serves for attaching a trailer, a trailer comprising a tow ball coupling which is connectable to the ball neck 12 engaging over the coupling ball 24.

In its operating position, shown in FIGS. 1, 2 and 3, the ball neck 12 is realized symmetrically with respect to a vertical longitudinal centre plane 30, in the same way as also the coupling ball 26, the longitudinal centre plane 30 being not only the longitudinal centre plane 30 of the ball neck 12 and of the trailer coupling 10, but in the operating position of the trailer coupling also coinciding with the vertical longitudinal centre plane 30 of the rear part 18 and of the motor vehicle body 20.

In this case, a centre axis 32 of the coupling ball 26 lies in particular in the vertical longitudinal centre plane 30, the centre axis 32 of the coupling ball 26 being established as a result of providing a centre axis 32 of the ball attachment 28 at the same time and/or additionally being established as a result of extending centrally and perpendicularly with respect to a flattening 34 of the coupling ball 26 which is provided on the coupling ball 26 on a side opposite the ball attachment 28 such that the form of the coupling ball 26, on the one hand, in the region of the ball attachment 28 and on the other hand in the region of the flattening 34 deviates from a complete ball surface 38 which extends about a ball centre point 36 which lies along the centre axis 32.

As shown in FIGS. 1 and 2, the trailer coupling can serve not only for the purpose of connecting a trailer to the motor vehicle body 20, but also for the purpose of fixing a load carrier, which is given the overall reference of 40, on the motor vehicle body 20.

The load carrier 40, in this case, serves, for example, for the purpose of transporting bicycles 42, however it is also conceivable to transport other arbitrary type loads using the load carrier 40.

The load carrier 40 includes a load carrier base 44, which is realized, for example, in the form of a basic frame for receiving the different loads and is provided with a load carrier holding device 50 by way of which the load carrier 40 is securable on the ball neck 12.

As shown in FIGS. 2 and 3, in the case of a first exemplary embodiment of the ball neck 12, it is provided in a ball neck portion 52, which directly adjoins the end 24 and the ball attachment 28, with positioning bodies 54a and 54b which protrude to the side beyond said ball neck portion and are realized, for example, by solid journals 56a, 56b which are integrally moulded on the ball neck portion 52 and protrude to the side beyond the ball neck portion 52, in particular with a cylindrical lateral surface.

In the event of the ball neck being provided with a receiving means 53 for a socket, the ball neck portion 52 lies between the receiving means 53 and the end 24.

In addition, the ball neck portion 52 preferably extends, proceeding from the end 24, along the ball neck 12 over a maximum of a distance which corresponds to 1.5 times the diameter of the ball surface 38 of the coupling ball 26.

The ball neck portion 52 preferably extends, proceeding from the end 24, simply over a distance which corresponds to the diameter of the ball surface 38.

In this case, the solid journals 56a and 56b are arranged symmetrically with respect to the longitudinal centre plane 30 and also extend, proceeding from the ball neck portion, symmetrically with respect to the vertical longitudinal centre plane 30.

As an alternative to the integral moulding of the positioning bodies 54 on the ball neck portions 52, it is also possible, however, to realize the positioning bodies 54 by a pin which penetrates the ball neck portion 52 in a bore, for example with a cylindrical lateral surface, which then forms the journals 56a, b with its two ends.

The positioning bodies 54, in particular the journals 56, are preferably realized such that the form of the positioning bodies 54a and 54b is developed in each case in a mirror-symmetrical manner with respect to the longitudinal centre plane 30.

Figure 4:
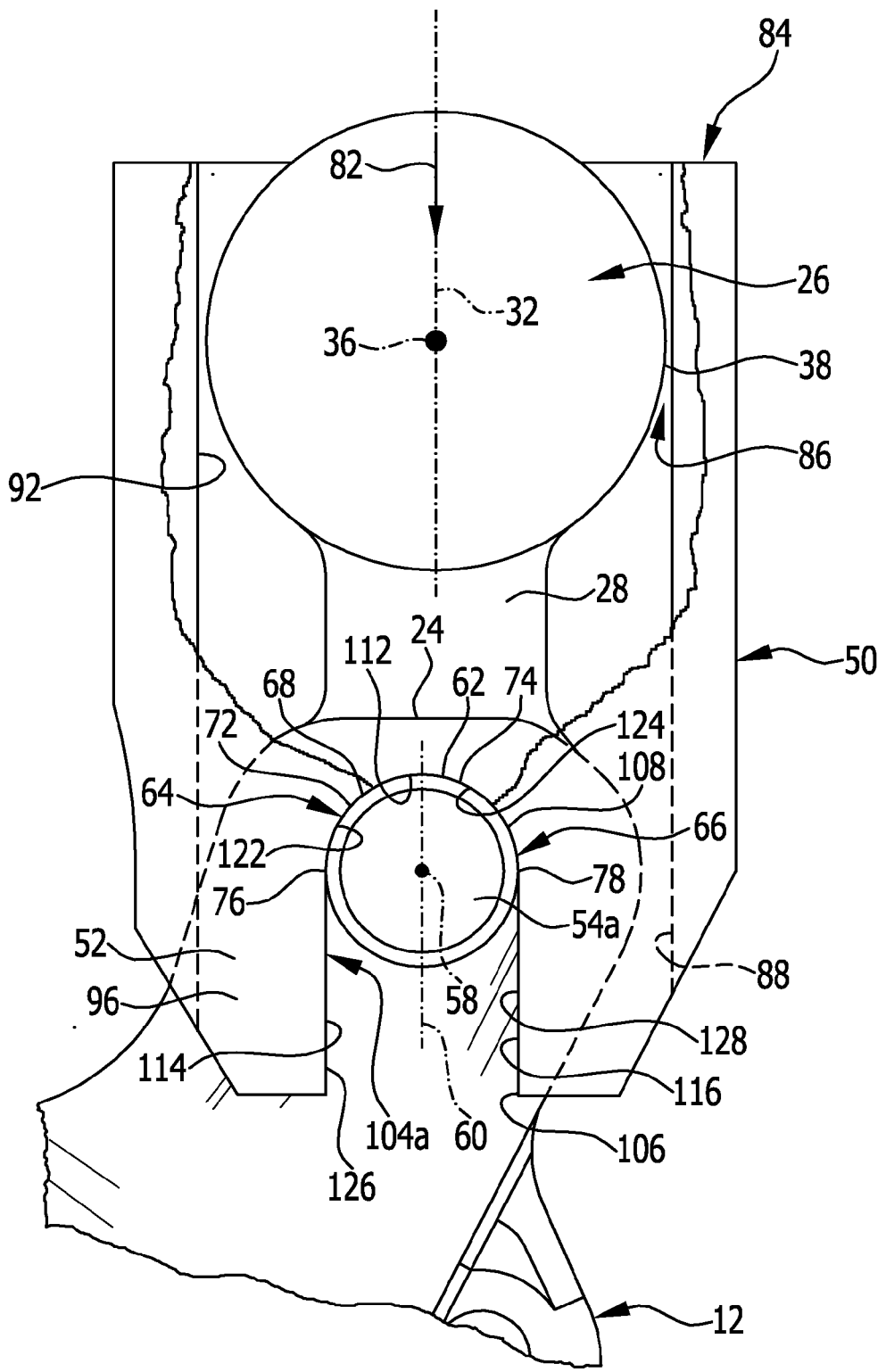
FIG. 4 shows a partially broken-open representation of the first embodiment of the load carrier holding device, placed onto the first exemplary embodiment of the ball neck of the trailer coupling.

As can be seen in particular in FIGS. 3 and 4, the positioning bodies 54a and 54b extend with their longitudinal axis 58 in a direction of extension 59 which runs transversely, preferably perpendicularly, to the longitudinal centre plane 30.

The longitudinal axis 58 lies, for example, in an in particular vertical cross plane 60 which preferably extends perpendicularly to the longitudinal centre plane 30 and additionally extends parallel to the centre axis 32 of the coupling ball 26, in particular extends through the centre axis 32 of the coupling ball 26.

The positioning bodies 54 include first positioning surfaces 64, 66 which lie on both sides of an outside surface 55 of the same and extend parallel to the longitudinal axis 58 and to the direction of extension 59.

In particular, the first positioning surfaces 64, 66, extend proceeding from an apex line 62 which lies on the outside surface and faces the coupling ball 26.

The apex line 62, in this case, lies in particular in the cross plane 60 which runs, on the one hand, through the coupling ball 26 and, on the other hand, intersects the positioning bodies 54a and 54b in particular centrally, as shown in FIGS. 3 and 4.

The first positioning surfaces 64 and 66 of the positioning bodies 54a and 54b, which extend preferably parallel or at an angle of up to 20° with respect to the longitudinal axis 58 of the positioning bodies 54a, 54b, lie on opposite sides of the cross plane 60, the positioning surfaces 64 and 66 being part surfaces of a geometric outside lateral surface of the positioning bodies 54a and 54b, which is given the reference overall of 68 and intersects the ball neck portion 52.

In the event of the realization of the positioning bodies 54a and 54b in the form of cylindrical journals, the outside lateral surface 68 of the positioning bodies 54a and 54b provides a cylindrical lateral surface, the longitudinal axis 58 forming a cylinder axis for said cylindrical lateral surface.

The positioning surfaces 64 and 66, in this case, proceeding from the apex line 62, extend on both sides preferably at an increasing spacing from the in particular vertical cross plane 60, the first positioning surfaces 62 and 64 comprising positioning surface regions 72 and 74, which extend initially transversely with respect to the cross plane 60 and also transversely with respect to the longitudinal centre plane 30 and at an increasing spacing from the coupling ball 26 also at increasing spacing from the cross plane 60 and which merge into guide surface regions 76, 78 of the first positioning surfaces 64 and 66 which extend approximately parallel or parallel to the cross plane 60.

In this case, the positioning surface regions 72 and 74 merge for example steplessly into the guide surface regions 76 or 78.

In the case of the first exemplary embodiment of the ball neck 12 according to the invention shown in FIGS. 2 to 4, the positioning bodies 54a and 54b lie in such a manner near the ball attachment 28 that a spacing between the apex line 62 of the positioning bodies 54a, b and the end 24 of the ball neck 12, at which the ball attachment 28 begins, is smaller than 1.5 times the extent of the ball attachment 28 between the second end 24 and the coupling ball 26.

In addition, in particular the spacing between the positioning bodies 54a and 54b and an equator plane 80 of the coupling ball 26, which extends through the ball centre point 36 and perpendicularly with respect to the central axis 32, is smaller than 1.5 times the diameter of the ball surface 38 of the coupling ball 26.

In particular, the first positioning surfaces 64, 66 lie with the positioning surface regions 72, 74 and the guide surface regions 76, 78 outside a projection contour PK, this means on a side of the projection contour PK which is remote from the ball neck portion 52 and is generated as a result of the projection of the coupling ball onto the positioning body 54, in particular onto the outside surface thereof.

Consequently, in particular the ball neck portion 52, which carries the positioning bodies 54a, 54b, lies inside the projection contour PK, and the positioning bodies 54a, 54b extend proceeding from said ball neck portion 52 up to the first positioning surfaces 64, 66.

In this case, the projection is effected parallel to a loading direction 82 in which the load carrier holding device 50 is loadable onto the coupling ball 26 and the ball neck 12.

The loading direction 82 preferably extends approximately parallel, in particular parallel to the centre axis 32.

Approximately parallel, in this case, is to be understood as the angle between the loading direction 82 and the centre axis 32 being a maximum of 10°.

A first embodiment of the load carrier holding device 50 is loadable onto the afore-described ball neck 12, which carries the coupling ball 26 on the second end 24 and the positioning bodies 54a and 54b in the ball neck portion 52 which lies close to the second end 24, the placing of the load carrier holding device 50 is effected in the loading direction 82 which extends in particular parallel to the longitudinal centre plane 30 and approximately parallel to the centre axis 32.

The approximately parallel development of the loading direction 82 is to be understood as a maximum angle between the centre axis 32 of the coupling ball 26 and the loading direction 82 having to be less than 30° such that the loading direction is able to extend parallel and/or obliquely with respect to the centre axis 32 or also in a curved manner.

The load carrier holding device 50 comprises, in turn, a housing body 84 in which a ball receiving means 86 is provided for the coupling ball 26, the ball receiving means 86, proceeding from a receiving opening 88 of the housing body 84, being a cylindrical ball guide surface 92 which extends into the housing body 84.

The housing body 84 is additionally provided with holding elements 96, the holding elements 96 comprising in each case one position receiving element 104 which interacts in each case with one of the positioning bodies 54.

The holding elements 96 provide in particular a rigid connection to the housing body 84 such that the position receiving elements 104 are arranged in a rigid manner both relative to the housing body 84 and relative to one another.

The position receiving element 104a, which is shown in FIG. 4 and which interacts with the positioning body 54a, extends, for example, proceeding from a receiving opening 106 up to a receiving base 108 which is opposite the receiving opening 106.

The position receiving element 104, proceeding from the receiving opening 106, includes receiving surfaces 114 and 116 which extend as far as into the receiving base 108 and which are realized in the region of the receiving base 108 as support surface regions 122 and 124 which can extend toward one another in a direction counter to the loading direction 82 and can merge into one another for example in the region of a base line 112 of the receiving base 108 or can end at a spacing from one another.

In addition, the receiving surfaces 114 and 116 include guide surface regions 126 and 128 which extend following the support surface regions 122 and 124 up to the receiving opening 106 and extend in particular parallel to the loading direction 82.

The guide surface regions 126 and 128, in this case, serve for the purpose of guiding the positioning body 54, which enters through the receiving opening 106 into the position receiving elements 104, as a result of this latter abutting against the guide surface regions 76 and 78 of the positioning bodies 54 and thus guiding the load carrier holding device 50 when loaded in the loading direction 82, whilst the support surface regions 122 and 124 of the position receiving elements 104 are developed such that they abut as extensively as possible against the positioning surface regions 72 and 74 of the positioning surfaces 64 and 66 of the positioning bodies 54.

Consequently, in the case of the first embodiment of the load carrier holding device 50 realized according to the invention, the entire load of the load carrier 40 rests on the positioning bodies 54a and 54b, namely as a result of, on the one hand, the support surface regions 122 and 124 of the position receiving elements 104 abutting as extensively as possible against the positioning surface regions 72 and 74 of the positioning bodies 54.

In addition, the development of the support surface regions 122 and 124 which widen in the loading direction 82 and the development of the positioning surface regions 71 and 74 which widen in an almost approximately identical manner in the loading direction cause the position receiving elements 104 to experience an exact alignment transversely with respect to the loading direction 82 and transversely with respect to the cross plane 60 relative to the positioning bodies 54.

On the other hand, the guide surface regions 126 and 128 and the position receiving elements 104 serve for the purpose of guiding the housing body 84 when loaded in the loading direction 82 on the positioning body 54, in particular on the guide surface regions 76 and 78 of the same, such that the position receiving elements 104 abut against the positioning surface regions 72 and 74 of the positioning body 54 by way of the support surface regions 122 and 124.

When placing the housing body 84 onto the ball neck 12 with the coupling ball 26, first of all the coupling ball 26 is introduced through the receiving opening 88 into the ball receiving means 86, the ball guide surface 92 abutting against the ball surface 38 of the coupling ball 26 with play and guiding the coupling ball 26 as it moves into the ball receiving means 86 in the direction of the end surface 94 until the support surface regions 122 and 124 and the position receiving elements 104 abut against the positioning surface regions 72 and 74 of the positioning bodies 54 such that the load carrier holding position is reached.

In said load carrier holding position of the first embodiment of the load carrier holding device 50, the entire load is transferred from the position receiving elements 104 to the positioning bodies 54 and from these to the ball neck 12, whilst the coupling ball 26 just abuts against the ball guide surfaces 92 and consequently supports a supporting of the housing body 84 relative to the ball neck 12 against a tilting of the housing body 84 about the positioning bodies 54, in particular about a tilt axis KAP which is formed by the longitudinal axes 58 of the same which extend transversely with respect to the centre axis 32.

In addition, the described interaction between the positioning bodies 54 and the position receiving elements 104 prevents the housing body 84 rotating about a rotational axis D which extends approximately parallel to the loading direction 82.

In this case, an approximately parallel development with respect to the loading direction 82 is to be understood as a development of the rotational axis D where the rotational axis D encloses a maximum angle 30° with the loading direction.

Figure 5:
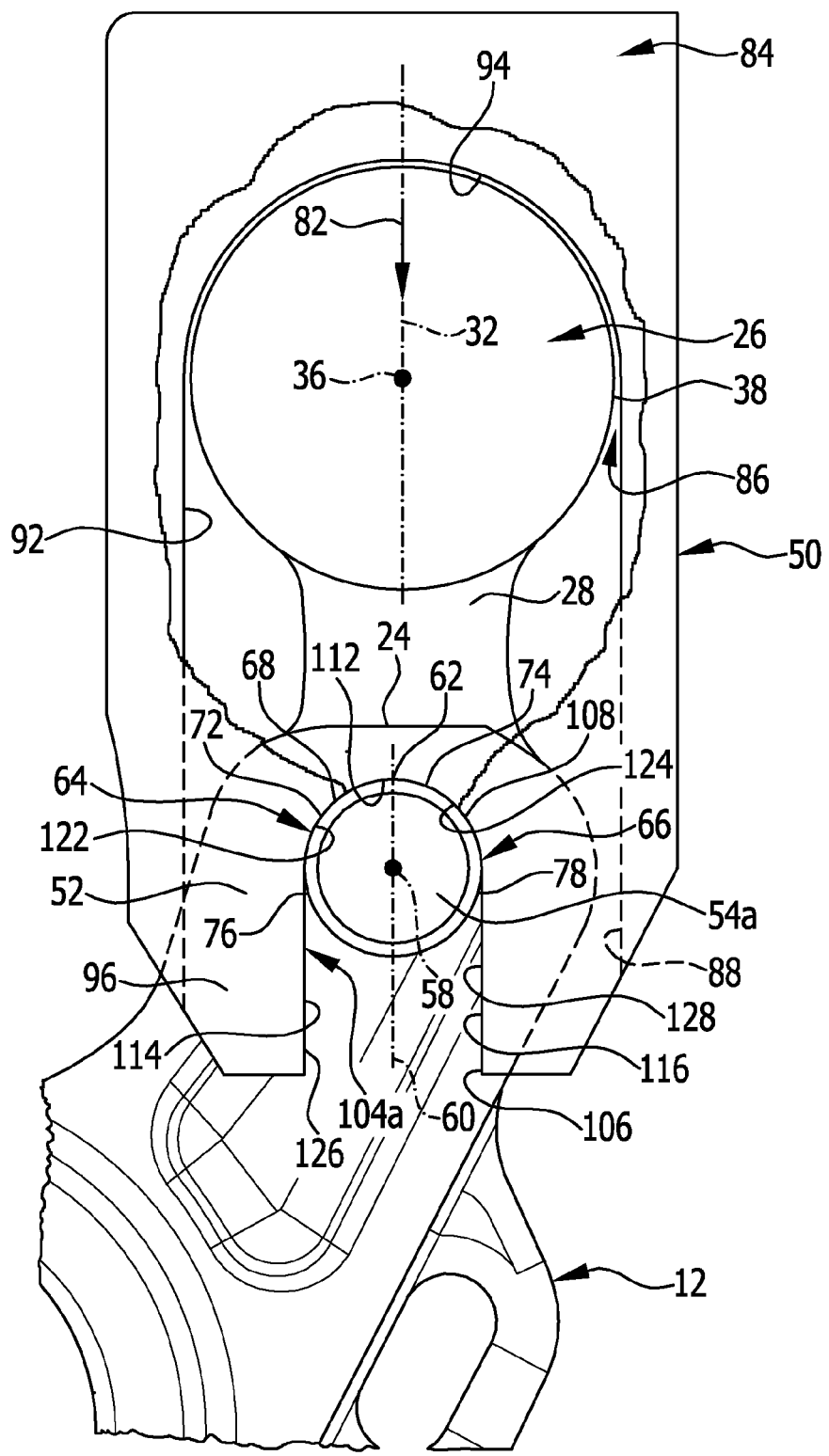
FIG. 5 shows a representation similar to FIG. 4 of a second embodiment of the load carrier holding device placed onto the first exemplary embodiment of the ball neck.

As an alternative to this, however, it is also conceivable in the case of a second embodiment shown in FIG. 5 to realize an end surface 94 of the ball receiving means 86 arranged opposite the receiving opening 88 for example as a conical surface or as a spherical cap surface and to realize the housing body 84 with the stabilizing elements 96 and the position receiving elements 104 such that the entire load of the load carrier 40 is transferred from the end surface 94 to the coupling ball 26 and the positioning bodies 54 simply serve for the purpose of supporting the housing body 84 against tilting on all sides about tilt axes KAK which penetrate the coupling ball 26 and extend transversely relative to the centre axis 32, in this case primarily the guide surface regions 126 and 128, as a result of abutting against the guide surface regions 76 and 78 of the positioning bodies 54, on the one hand, preventing the housing body 84 tipping about the coupling ball 26 and, on the other hand, preventing the housing body 84 rotating about a rotational axis D which extends approximately parallel to the loading direction 82, whilst the support surface regions 122 and 124 of the receiving surfaces 114 and 116 can rest on the corresponding positioning surface regions 72 and 74 of the positioning surfaces 64 and 66 of the positioning bodies 54 for example on one side, that means on one side of the ball neck 12 or one side of the cross plane 60, in order to bring about additional support.

Figure 6:
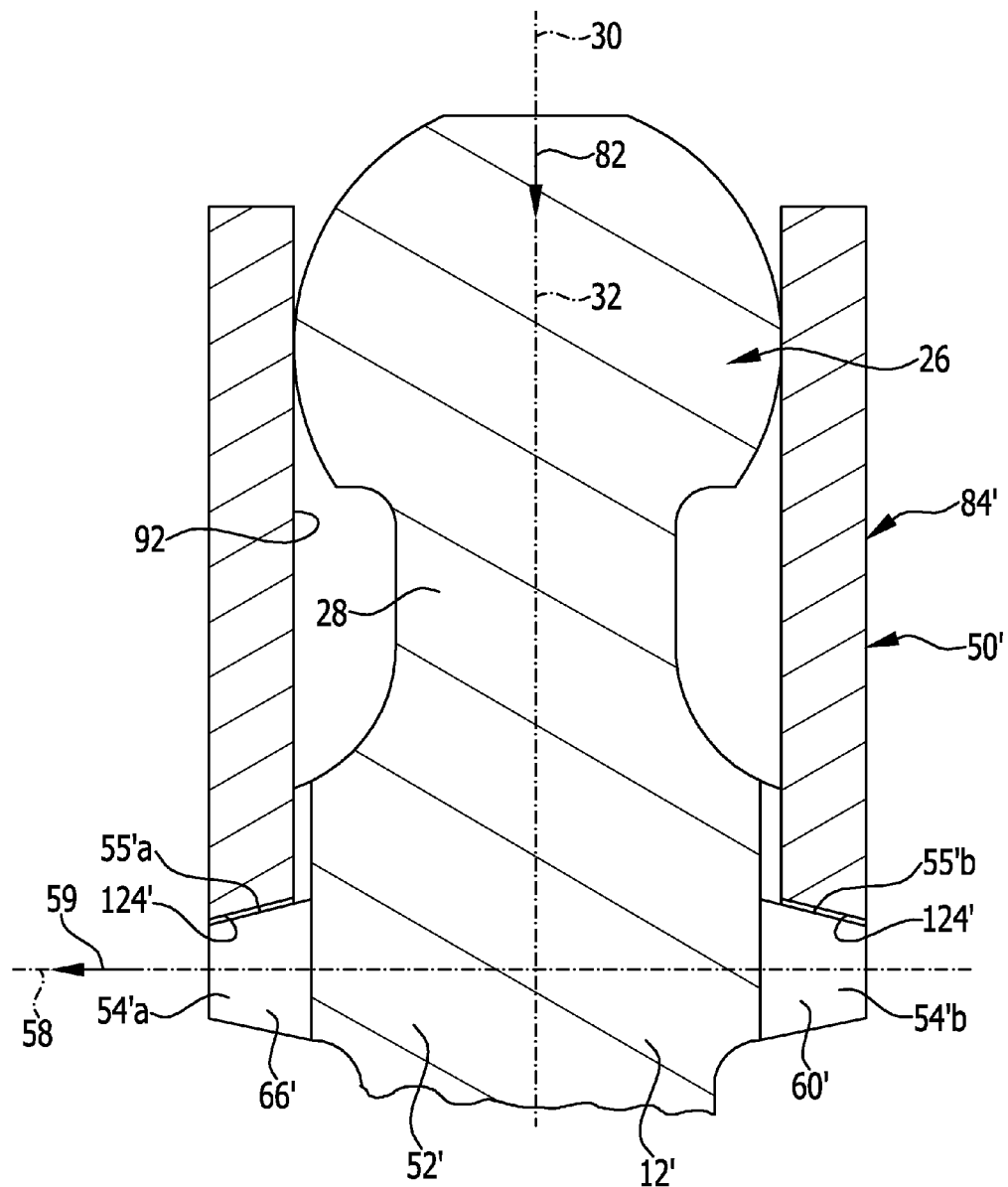
FIG. 6 shows a representation similar to FIG. 2 of a second exemplary embodiment of the ball neck and a third embodiment of the load carrier holding device.

In the case of a second exemplary embodiment of a ball neck according to the invention, shown in FIG. 6, the positioning bodies 54'a and 54'b are realized such that their outside surfaces 55'a, 55'b do not extend cylindrically with respect to the longitudinal axis 58, but taper conically away from the ball neck portion 52' as the extension increases in the direction of extension 59 such that, as the spacing from the ball neck portion 52' increases in the direction of extension 59, the outside surfaces 55'a and 55'b are at a smaller radial spacing from the longitudinal axis 58.

The effect of this is that the support surface regions 122' and 124' of a third embodiment of the load carrier holding device according to the invention, which support surface regions rest on said positioning surfaces 64' and 66' which are formed by the outside surfaces 55'a and 55'b, experience a force which is in addition to the support and is directed parallel to the direction of extension 59 and, as a result, the housing body 84 is centred relative to the vertical longitudinal centre plane 30, which results in an improvement in the fixing of the housing body 84' on the ball neck 12', in particular when the support surface regions 122' and 124' are adapted to the conical development of the outside surfaces 55'a and 55'b of the positioning bodies 54'a and 54'b.

This type of realization of the positioning bodies 54'a and 54'b consequently improves the alignment of the housing body 84' or centring of the housing body 84' relative to the vertical longitudinal centre plane 30 in the region of the positioning bodies 54'a and 54'b and consequently results in the housing body 84' being fixed on the ball neck with even less play.

Apart from this, in the case of said solution which is a combination of the second exemplary embodiment of the ball neck 12' according to the invention and the third embodiment of the load carrier holding device according to the invention with the housing body 84', those elements which are identical to those of the previous combination of ball neck and housing body are provided with the same references such that reference can be made to the entire content of the statements concerning said combination with regard to the description.

Figure 7:
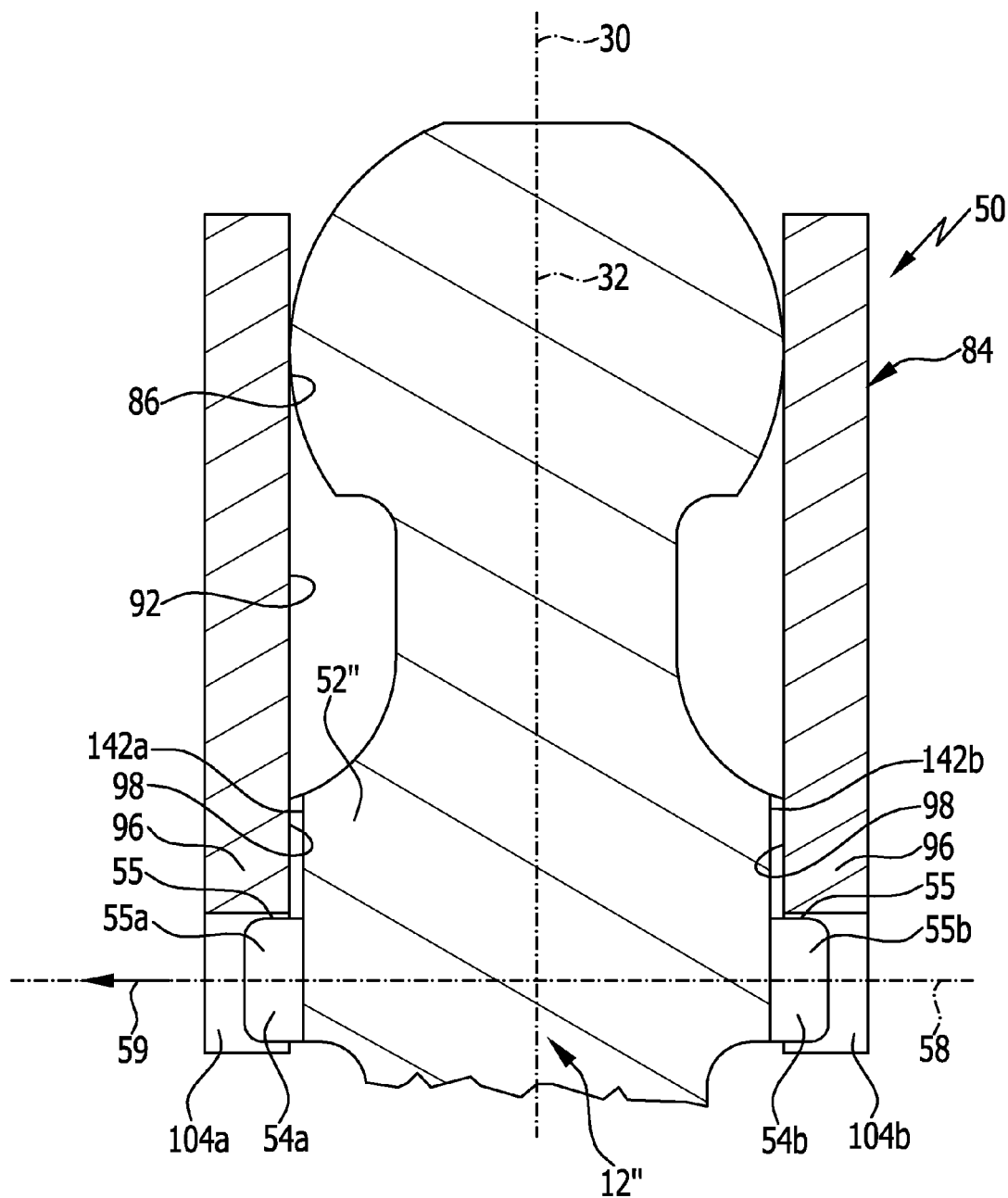
FIG. 7 shows a representation similar to FIG. 2 of a third exemplary embodiment of the ball neck with the first embodiment of the load carrier holding device.

In the case of a third exemplary embodiment of a ball neck 12", shown in FIG. 7, the housing body 84 is realized in the same manner as in the case of the first embodiment such that reference can be made to the entire content of said exemplary embodiment with regard to the description of the same.

In contrast to the first exemplary embodiment, second positioning surfaces 142a and 142b, which extend perpendicularly to the outside surfaces 55a and 55b of the first positioning bodies 54a and 54b and, for example, parallel to the vertical longitudinal centre plane 30, are associated with the positioning bodies 54a and 54b which are identical to the first exemplary embodiment.

Said additional second positioning surfaces 142, 142b are adapted to the spacing between each of the holding elements 96 and abut against inside surfaces 98 of the holding elements 96 facing the ball neck portion 52 such that, as a result, the holding elements 96 are fixed by the second positioning surfaces 142a, 142b against cross movements with respect to the vertical longitudinal centre plane 30 relative to the ball neck portion 52".

As a result of the interaction between the first positioning surfaces 64 and 66 of the positioning elements 54a and 54b in conjunction with the second positioning surfaces 142a, 142b, the load carrier holding device 50 can consequently be secured in a reliable manner in the region of the first positioning elements 54a, 54b both against movements parallel to the longitudinal centre plane 30 as a result of the interaction between the positioning body 54a and 54b and the position receiving elements 104a and 104b and against movements transversely relative to the vertical longitudinal centre plane 30 as a result of the interaction between the second positioning surfaces 142a, 142b and the inside surfaces 98 of the holding elements 96.

In this case, the load carrier holding device 50 is realized in the same manner as in the case of the first embodiment.

Apart from this, all those elements which are identical to those of the first exemplary embodiment are provided with the same references such that reference can be made to the entire content of the statements concerning the first exemplary embodiment concerning the description of the same.

Figure 8:
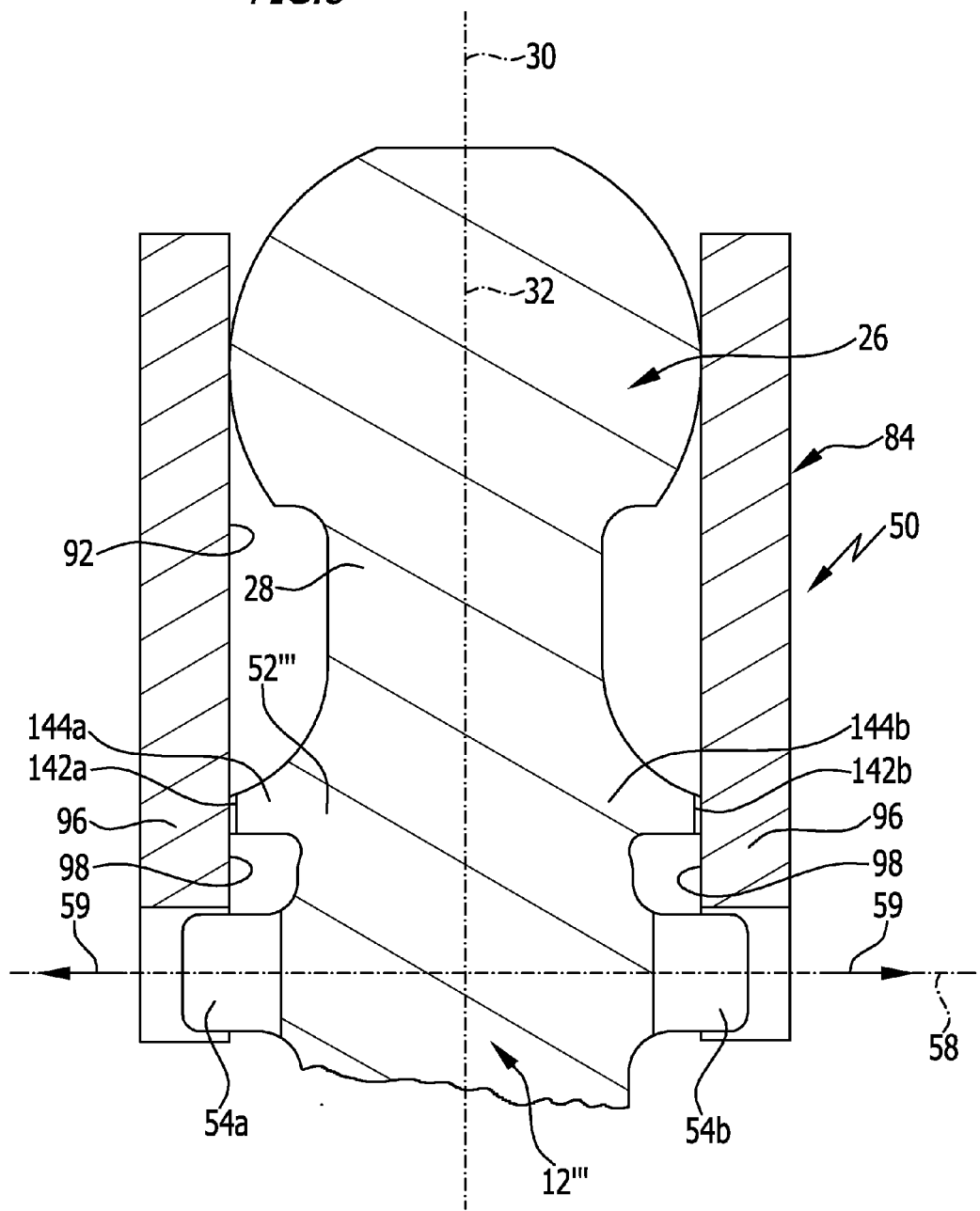
FIG. 8 shows a representation similar to FIG. 2 of a fourth exemplary embodiment of the ball neck with the first embodiment of the load carrier holding device.

In the case of a further solution, shown in FIG. 8, those elements which are identical to those of the first exemplary embodiment of the ball neck 12 are also provided with the same references such that reference can be made to the entire content of the statements concerning said first exemplary embodiment with regard to the description.

In contrast to the first exemplary embodiment and to the third exemplary embodiment of the ball neck 12, the second positioning surfaces 142*a* and 142*b* from the fourth exemplary embodiment are arranged on second positioning bodies 144*a* and 144*b*, which protrude from the ball neck portion 52 parallel to the direction of extension 59 of the first positioning bodies 54*a* and 54*b*, but are arranged at a spacing from the first positioning bodies 54*a* and 54*b* and for example lie between the first positioning bodies 54*a* and 54*b* and the ball attachment 28.

In the case of said fourth exemplary embodiment, the second positioning surfaces 142*a* and 142*b* also abut against the inside surfaces 98 of the holding elements 96 and consequently lead to a defined positioning of the holding elements 96 relative to the vertical longitudinal centre plane 30 such that the holding elements 96 with the support surface regions 122 and 124 are not supported transversely to the vertical longitudinal centre plane 30 on the first positioning bodies 54*a* and 54*b*, but are secured against such movements by the second positioning surfaces 142*a* and 142*b*.

Figure 9:
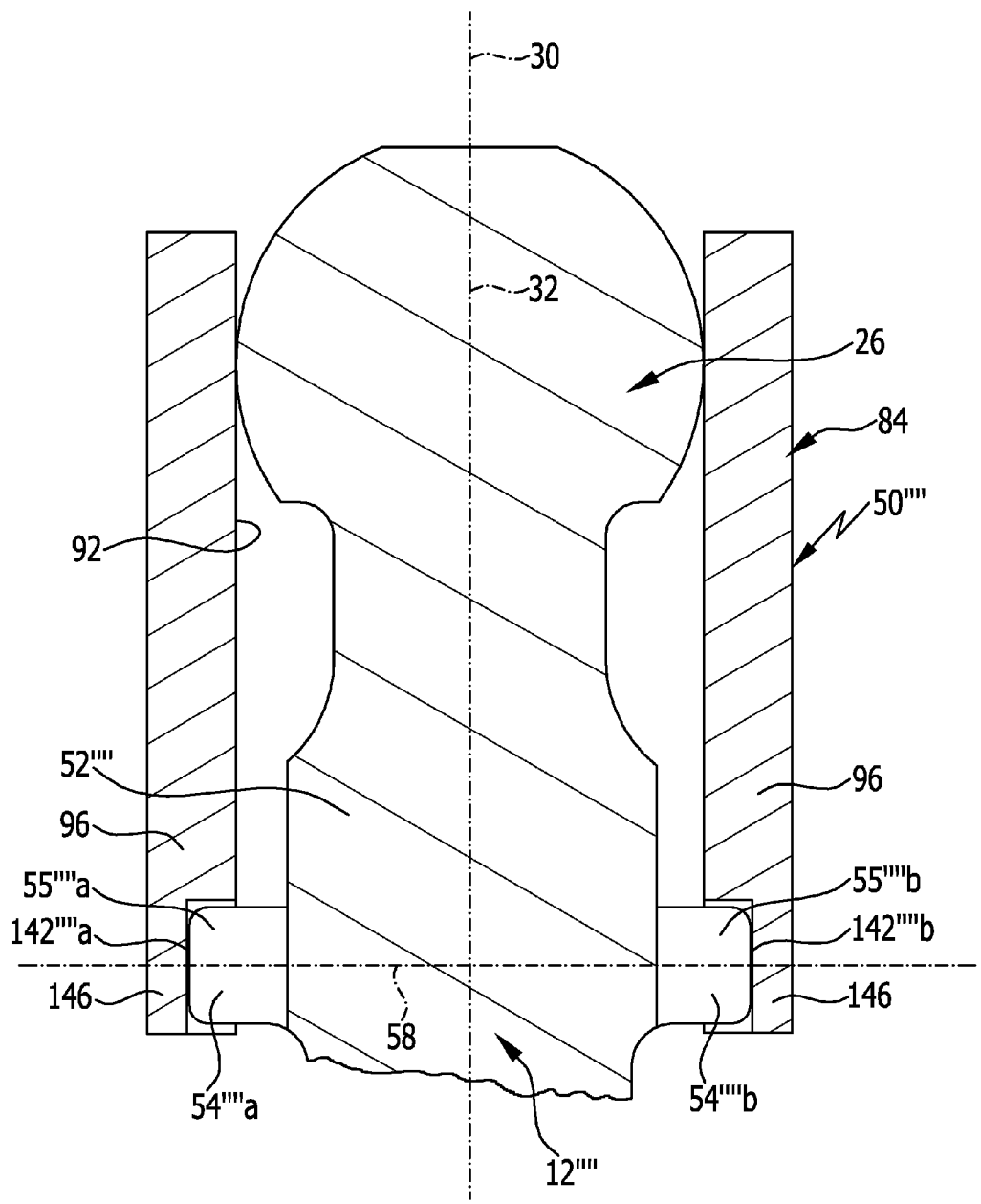
FIG. 9 shows a representation similar to FIG. 2 of a fifth exemplary embodiment of the ball neck with a fourth embodiment of the load carrier holding device.

In the case of a fifth exemplary embodiment of a ball neck 12'''', shown in FIG. 9, the second support surfaces 142'*a* and 142'*b* are not arranged on the ball neck portion 52'''' or on second positioning bodies provided especially, but lie at the end of the first positioning bodies 54''''*a* and 54''''*b* at a defined spacing from the vertical longitudinal centre plane 30 and extend in addition transversely with respect to the outside surfaces 55''''*a* and 55''''*b* and in particular consequently also transversely with respect to the longitudinal axis 58. The interaction between said second positioning surfaces 142''''*a* and 142''''*b* and the holding elements 96 of a fourth embodiment of the load carrier holding device is effected as a result of the holding elements 97 comprising wall regions 146 which engage over the second positioning surfaces 142''''*a* and 142''''*b* and are supported on the same with the load carrier holding device 50 in the placed-on state.

Consequently, as a result, the holding elements 96 are also fixed against movements transversely to the vertical longitudinal centre plane 30 and the load carrier holding device 50'''' is consequently received in a sturdy manner on the ball neck 12''''.

Apart from this, those elements which are identical to those of the preceding exemplary embodiment of the ball neck and of the preceding embodiments of the load carrier holding device are provided with the same references such that reference can be made to the entire content of the statements concerning the first exemplary embodiment with regard to the description of the same.

Figure 10:
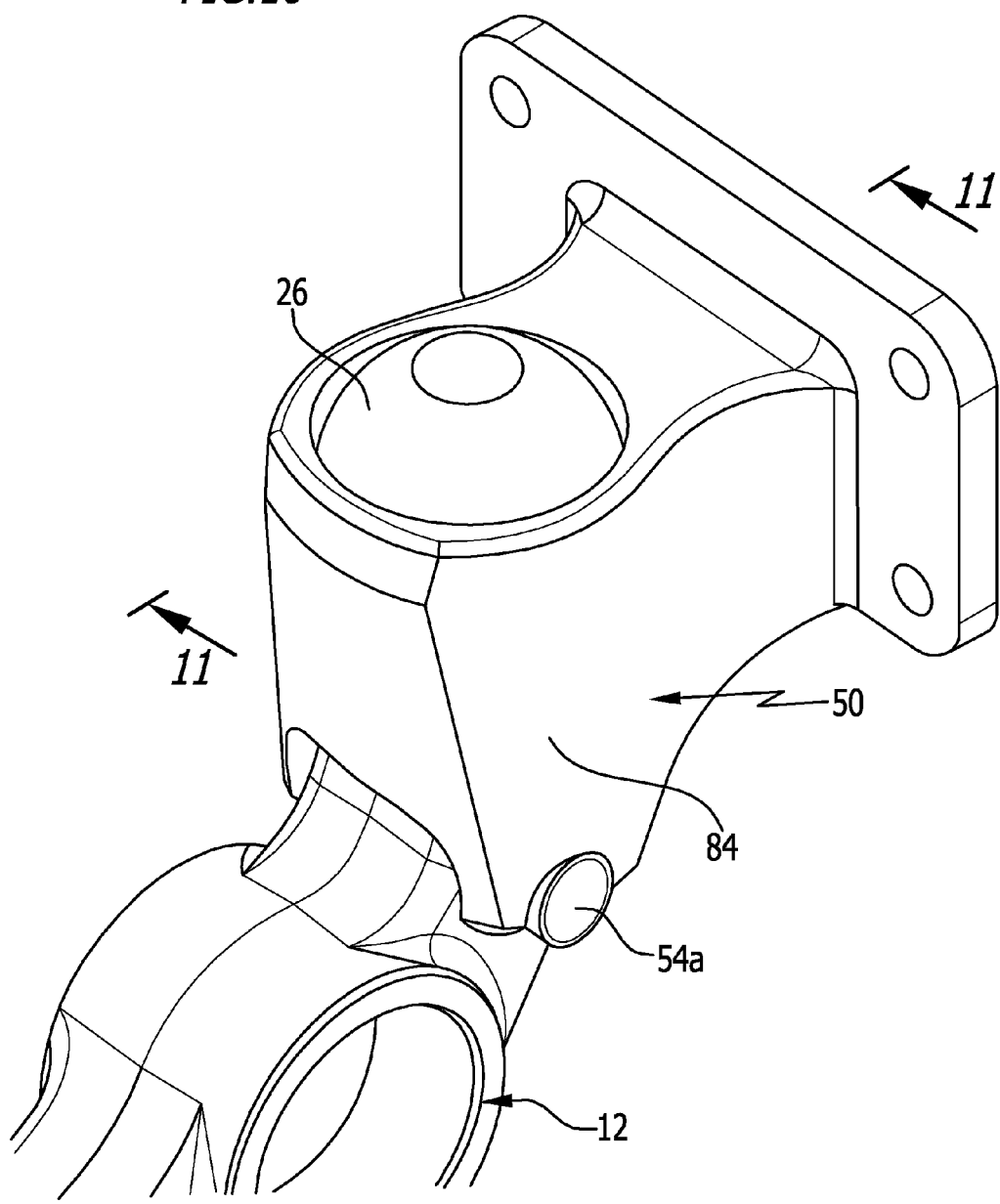
FIG. 10 shows a perspective representation of the first embodiment of the load carrier holding device.

A first realization of a fixing device, which is given the reference of 160 overall and comprises a fixing screw 164 which is screwed into a threaded bore 162, is provided for fixing the housing body 84 in the load carrier holding position on the ball neck 12, as in the case of the first embodiment of the load carrier holding device 50 shown in FIG. 10.

The threaded bore 162, in this case, forms a guide channel in which the fixing screw 164 as a fixing element is guided so as to be movable in a guide direction 165 between a release position and a fixing position.

Figure 11:
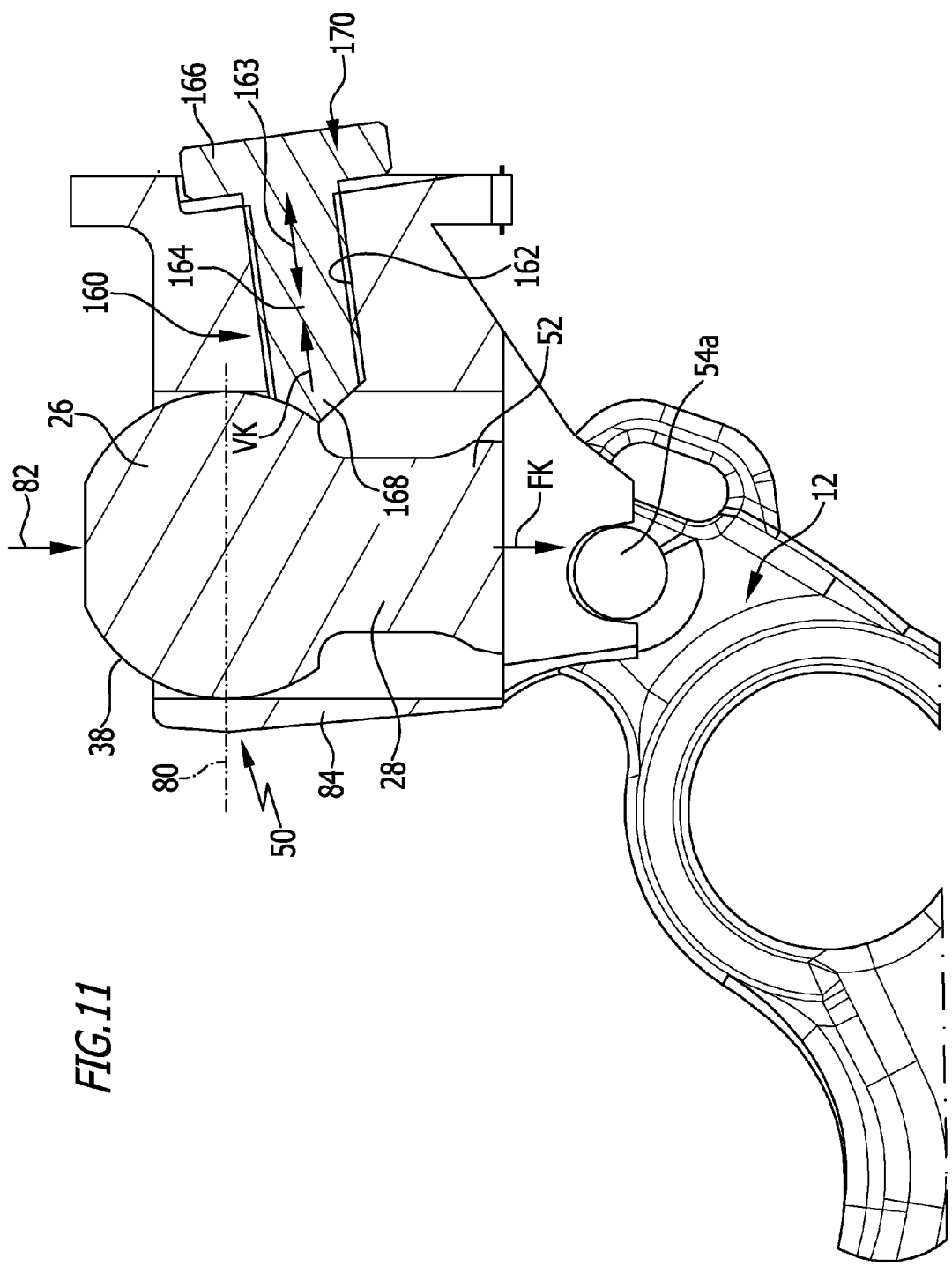
FIG. 11 shows a section along the line 11-11 in FIG. 10 with a first realization of the fixing device according to the invention.

The fixing screw 164, on the one hand, is provided with an actuating element 166 by way of which the fixing screw 164 is rotatable, and, on the other hand, comprises a screw head 168 which, in the fixing position shown in FIG. 11, abuts in a pressing manner against the ball surface 38 of the coupling ball 26 between the equator plane 80 and the ball attachment 28, in particular close to a transition to the ball attachment 28.

The actuating element 166 and the threaded bore 162 with the screwed-in fixing screw 164 form an actuating device 170.

As a result of the pressing abutment of the screw head 168 against the ball surface 38, on the one hand a force component is generated which acts as a fixing force FK in the loading direction 82 on the load carrier holding device 50 and, on the other hand, a force component is generated which is directed transversely to the loading direction 82 and acts as a clamping force VK which results, for example, in the load carrier holding device 50 with the housing body 84 abutting against the coupling ball 26, on a side located opposite the fixing screw 164 such that, as a result, the load carrier holding device 50 is fixed in a play-free manner, the fixing screw 164 as a result connecting the load carrier holding device 50 fixedly to the ball neck 12 and the coupling ball 26.

Figure 12:
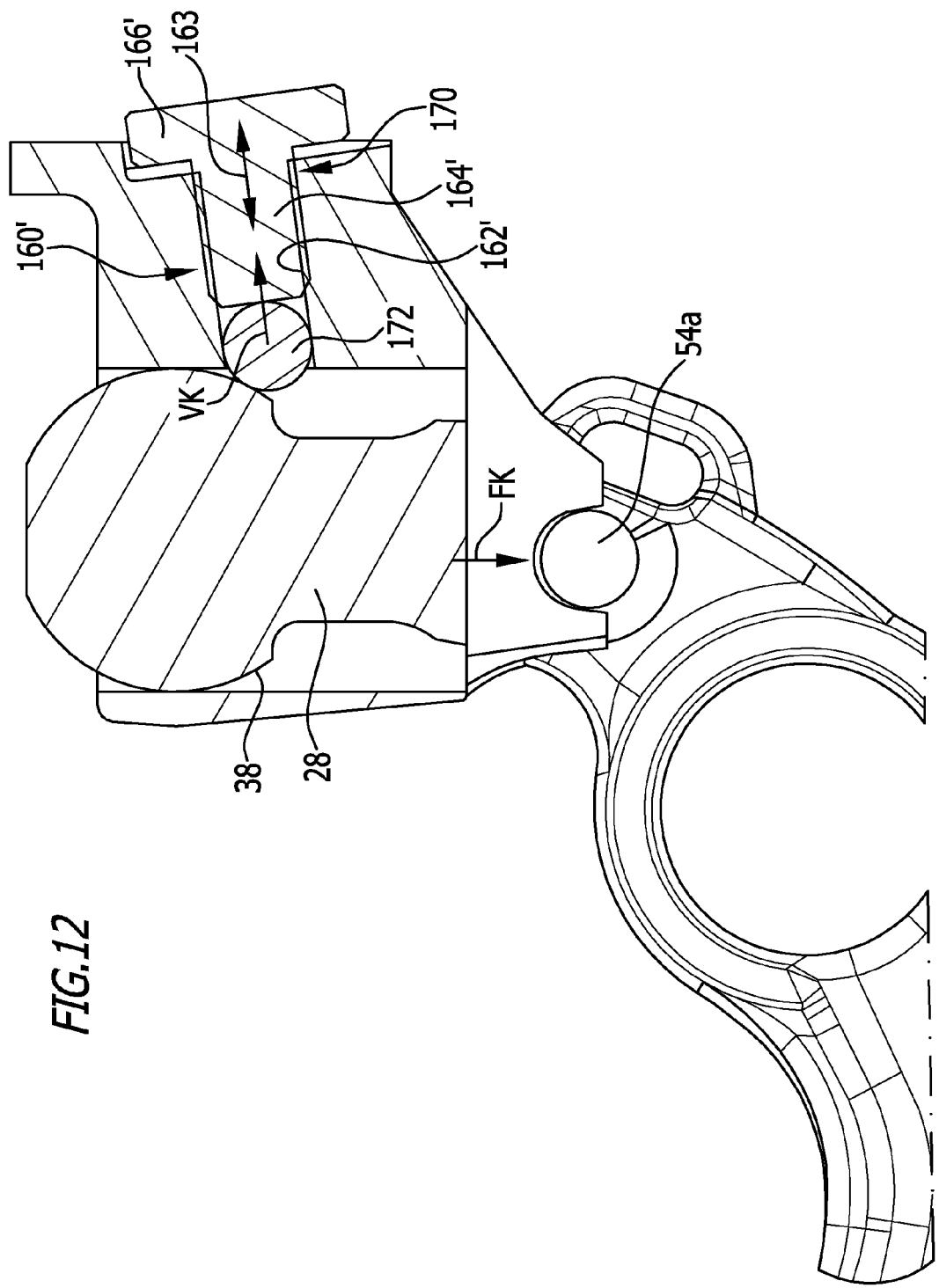
FIG. 12 shows a section along the line 11-11 in FIG. 10 with a second realization of the fixing device according to the invention.

A fixing screw 164', which is screwed into a threaded bore 162' but does not itself act directly on the ball surface 38, but by means of a fixing body 172 which, for example, is realized as a ball and also acts upon the ball surface 38 close to the transition of the same to the ball attachment 28, is provided in the case of a second realization of the fixing device 160' according to the invention, shown in FIG. 12.

The fixing screw 164' is also provided with an actuating element 166' by means of which said fixing screw is screwable into the threaded bore 162' such that these two form the actuating device 170 in order to act upon the fixing body 172.

Figure 13:
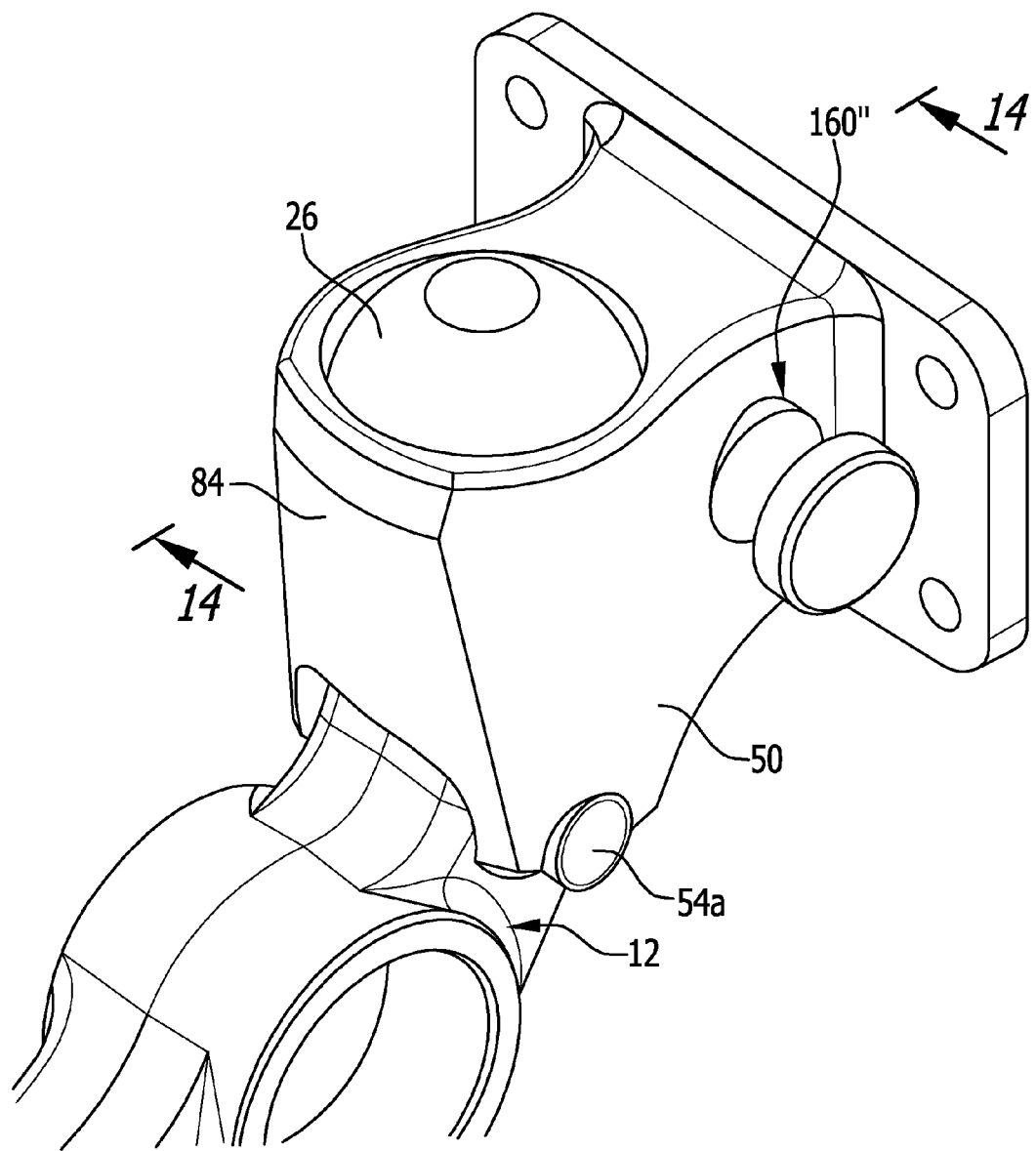
FIG. 13 shows a perspective representation of a fifth embodiment of the load carrier holding device with a third realization of the fixing device according to the invention.
Figure 14:
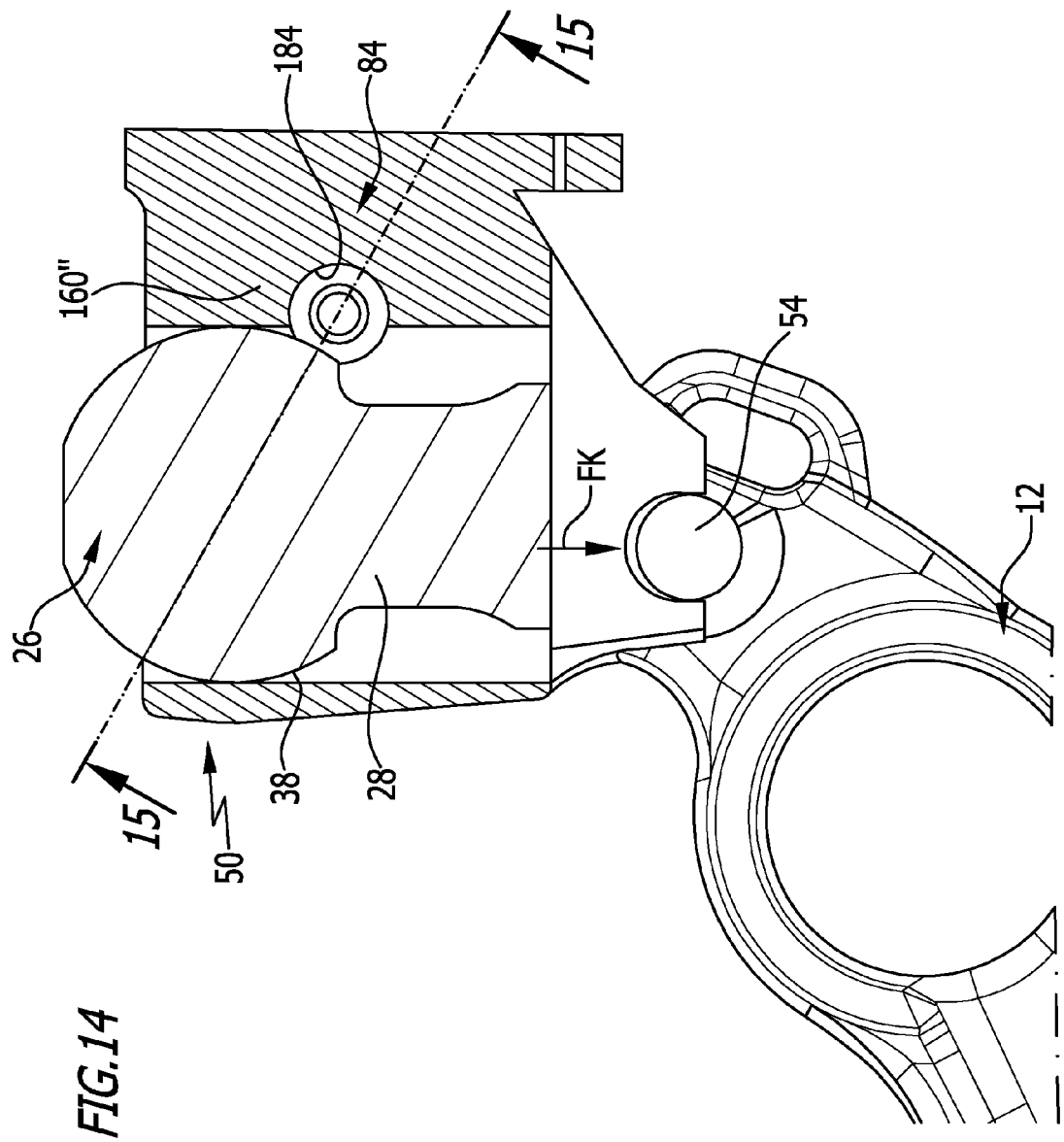
FIG. 14 shows a section along the line 14-14 in FIG. 13.
Figure 15:
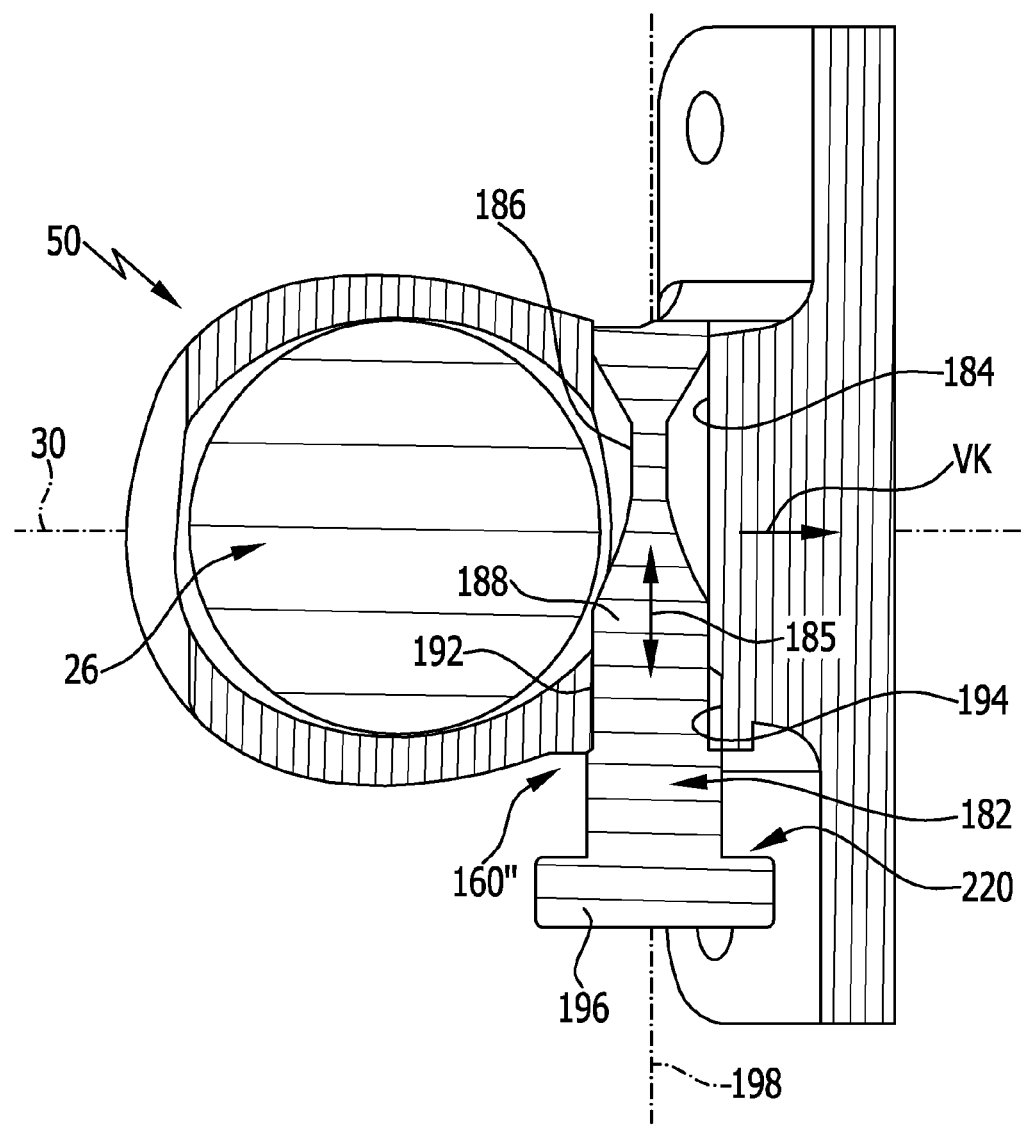
FIG. 15 shows a section along the line 15-15 in FIG. 14.

In the case of a fifth embodiment of the load carrier holding device and a third realization of a fixing device 160'' according to the invention, shown in FIGS. 13 to 15, a fixing journal, which is given the reference overall of 182, is provided as a fixing element which engages in a guide channel 184 which extends transversely through the housing body 84 in such a manner that the guide channel 184 is tangent to the ball surface 38 between the equator planes 80 and the ball attachment 28, in particular close to a transition to the ball attachment 28 when the fixing journal 182 is displaced in said guide channel in a guide direction 185 transversley with respect to the vertical longitudinal centre plane 30.

The fixing journal 182 comprises a constriction 186 to which connects a fixing surface 188 which is loadable onto the ball surface 38 in the region close to its transition to the ball attachment 28 in order to fix the load carrier holding device 50 relative to the coupling ball 26 and consequently also to the ball neck 12.

To this end, the fixing journal 182 is movable transversely with respect to the vertical longitudinal centre plane 30, that is to say movable such that, for placing the load carrier holding device 50 onto the coupling ball 26 and the ball neck 12, the constriction 186 is positionable such that the coupling ball 26 can pass in the loading direction 82 as a result of engaging in the guide channel 184.

If the load carrier holding device 50 is placed in such a manner that the position receiving elements 104 rest on the positioning bodies 54a and 54b, the fixing journal can thus be displaced transversely with respect to the longitudinal centre plane 30 in such a manner in the guide direction 185 that the fixing surface 188 acts upon the ball surface 38 close to its transition to the ball attachment 28 and consequently fixes the load carrier holding device 50 relative to the coupling ball 26 and the ball neck 12.

The displacement of the fixing journal 182 in the guide channel is preferably effected as a result of the fixing journal 182 comprising a threaded portion 192 which engages in a threaded portion 194 of the guide channel 184 such that, as a result of the threaded portions 192 and 194 and an actuating element 196, an actuating device 200 is formed which, as a result of rotating an actuating element 196 for rotating the fixing journal 182 about its longitudinal axis 198, displacement of the fixing journal 182 in the guide channel 184 is made possible in order either to position the constriction 186 such that the coupling ball 26 can pass the guide channel 184 or to position the fixing surface 188 such that it abuts against the ball surface 38.

Figure 16:
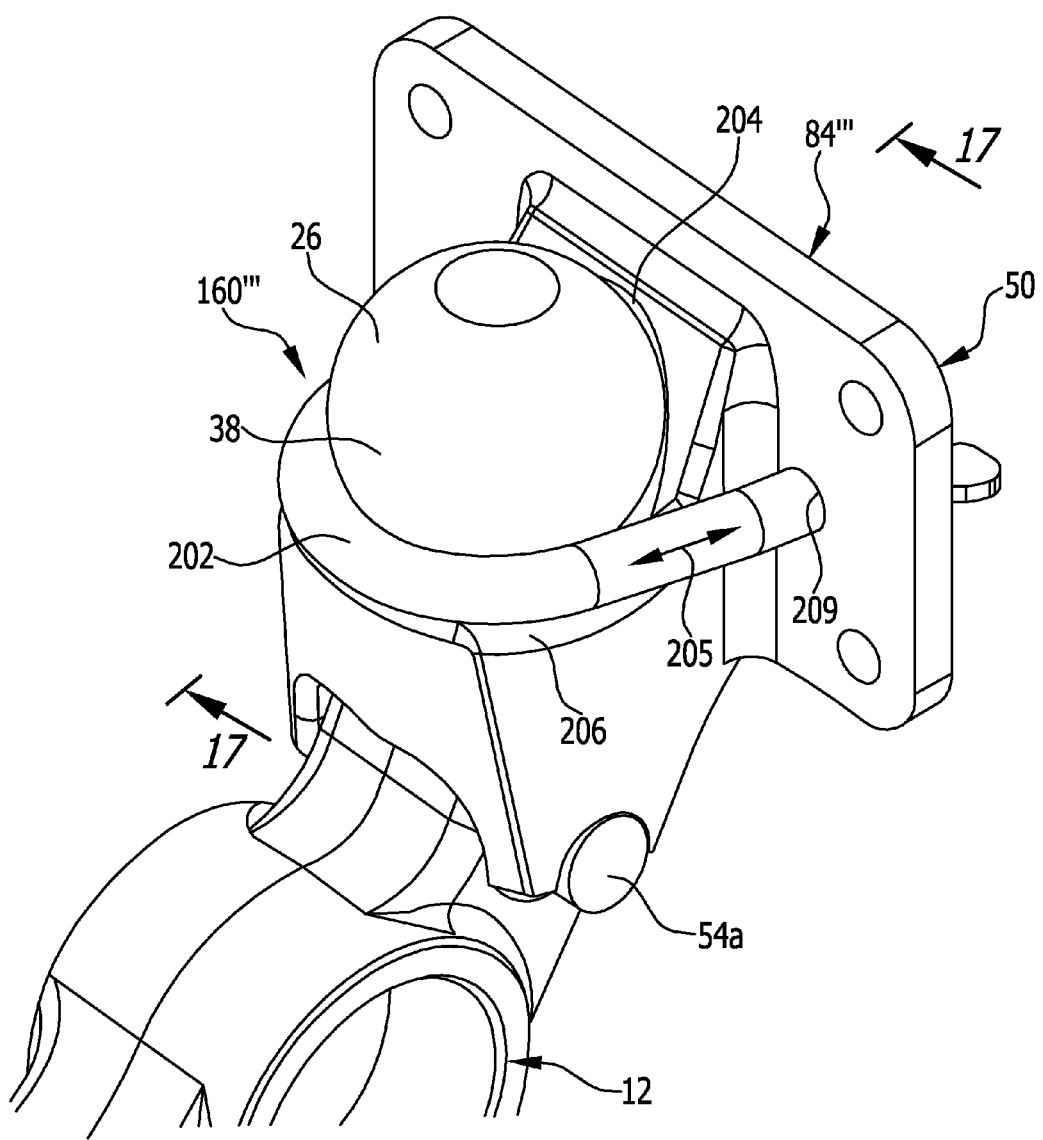
FIG. 16 shows a perspective representation of a sixth embodiment of the load carrier holding device with a fourth realization of the fixing device according to the invention.
Figure 17:
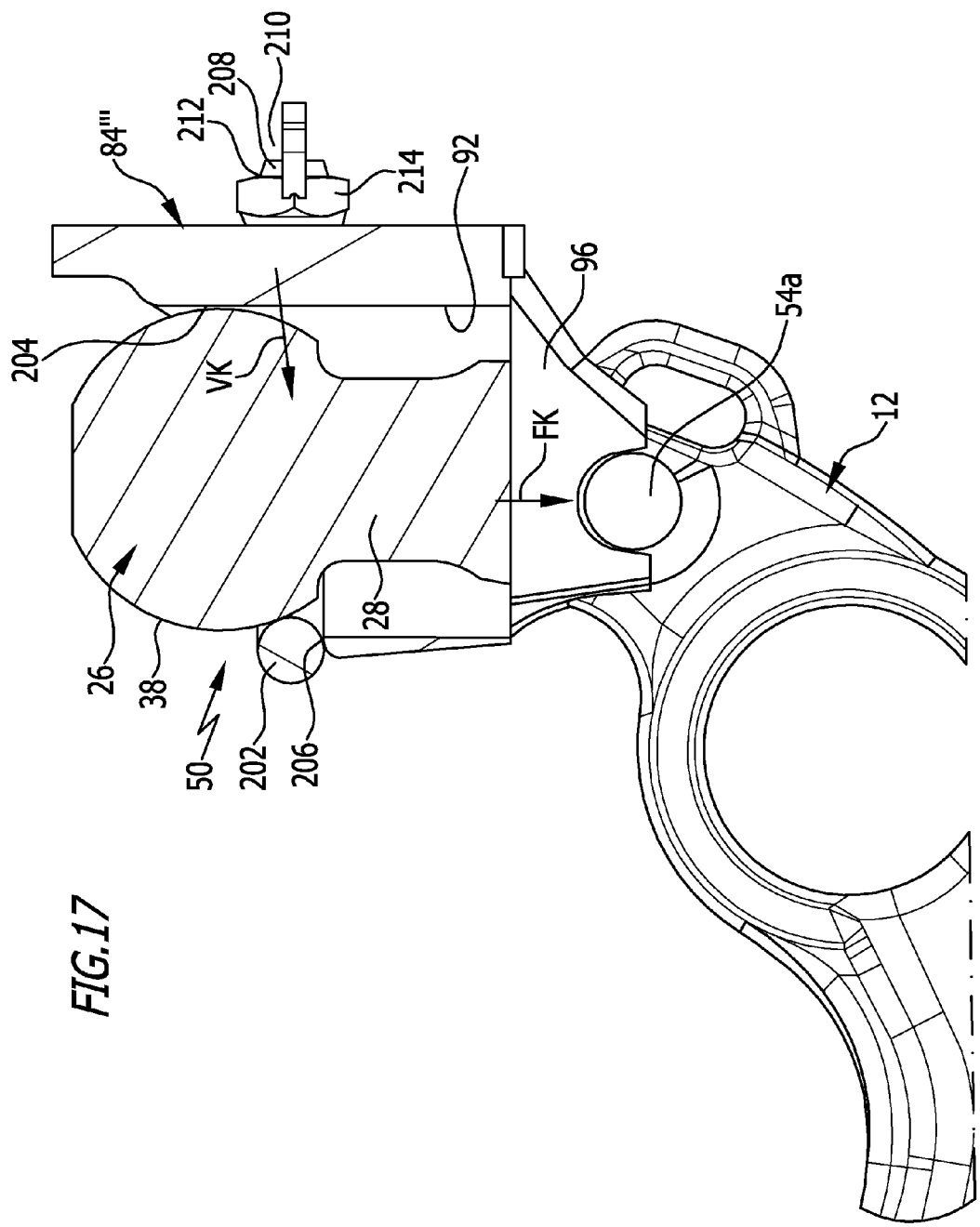
FIG. 17 shows a section along the line 17-17 in FIG. 16.

In the case of a fourth realization of a fixing device according to the invention, shown in FIGS. 16 and 17 in combination with a sixth embodiment of the load carrier holding device, a fixing bracket 202 which is realized in a U-shaped manner is provided as a fixing element which abuts against the coupling ball in the region of the ball surface 38 close to the transition to the ball attachment 28 and includes the coupling ball 26 for example on a side facing a motor vehicle and acts in the direction of a ball seat 204 in which the coupling ball 26 abuts with a part region of the ball surface 38, the ball seat 204 preferably being formed by a part region of the ball guide surface 92 of the housing body 84.

However, in the case of the sixth embodiment, the housing body 84, in the region in which the fixing bracket 202 engages, is cut out and forms a bearing surface 206 for fixing the fixing bracket 202 in a guide direction 205 such that the fixing bracket can be supported, on the one hand, on the ball surface 38 close to the ball attachment 28 and, on the other hand, on the bearing surface 206 and, as a result, is positioned in a defined manner relative to the ball surface 38 and, on the other hand, can then act upon the coupling ball 26 in the direction of the ball seat 204.

The fixing bracket 202, in the simplest case, is provided with bracket ends 208, which penetrate guide bores 209 of the load carrier holding device 50 and which comprise a thread 212 onto which a wing screw 214 is screwed such that the thread 212 and the wing screw 214 form an actuating device 220, as a result of tightening the wing screw 202, the fixing bracket is movable in the direction of the ball seat 204 in order to clamp the coupling ball 26 between the ball seat 204 and the fixing bracket 202 and, as a result, to secure the load carrier holding device 50 relative to the coupling ball and to the ball neck 12.

Apart from this, with regard to the further features which are identical to those of the preceding exemplary embodiments and embodiments, reference can be made to the statements concerning the preceding exemplary embodiments.

Figure 18:
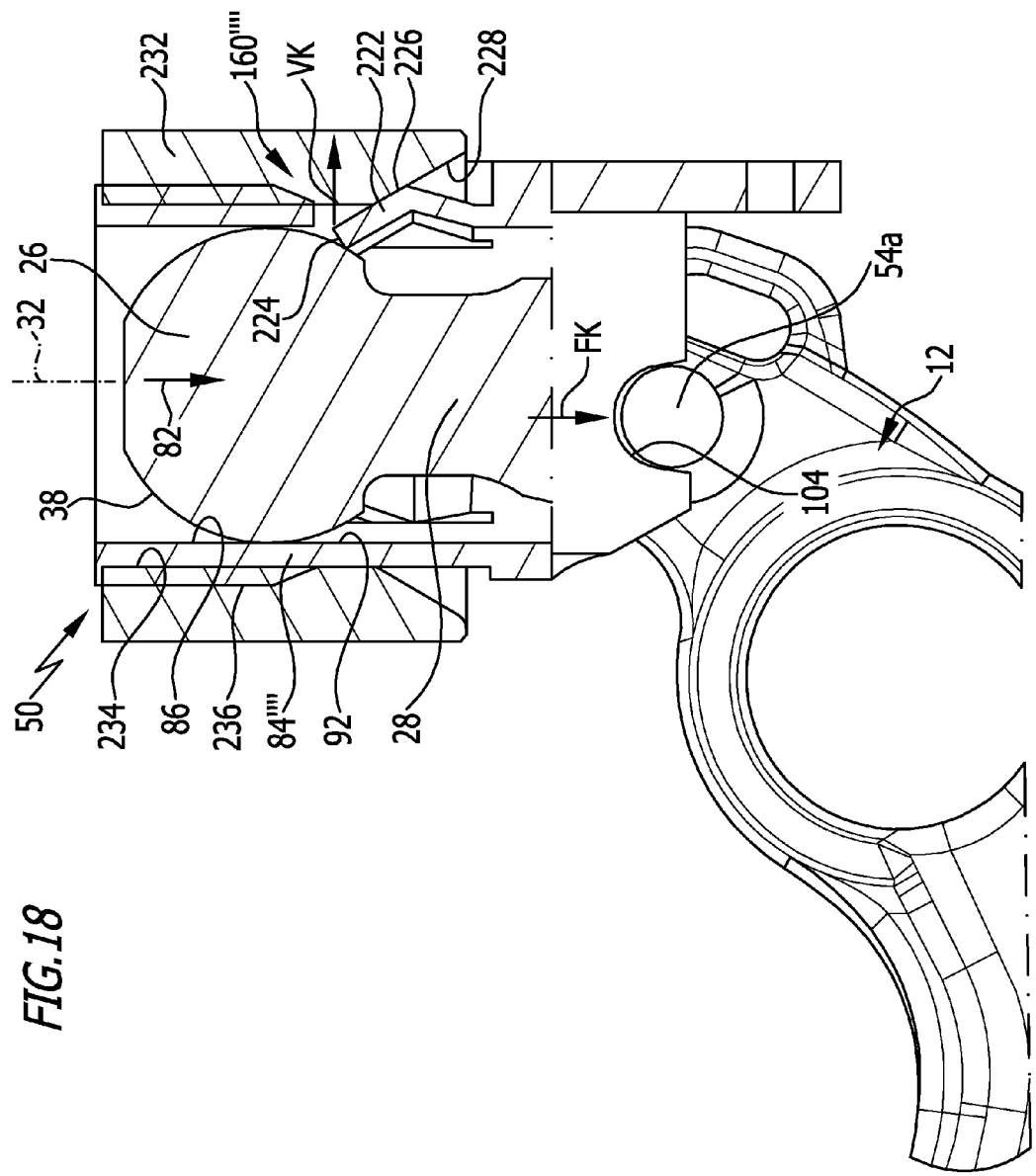
FIG. 18 shows a section similar to FIG. 11 through a seventh embodiment of the load carrier holding device with a fifth realization of the fixing device according to the invention.

In the case of a fifth realization of a fixing device 160'''', integrated into a seventh embodiment of a load carrier holding device and shown in FIG. 18, those elements which are identical to those of the preceding exemplary embodiments are provided with the same references so that reference can be made to the entire content of the statements in this regard concerning the description of the same.

In the case of the fifth realization of the fixing device 160'''' according to the invention, the housing body 84'''' is realized as a cylindrical sleeve which is provided with the ball receiving means 86 and in particular a ball guiding surface 92.

The housing body 84'''', in this case, is provided with fixing fingers 222 as fixing elements which are movable in the direction of the ball surface 38 into the ball receiving means 86 in order to be pressed by way of an end face 224 against the ball surface 38 between the equator plane 80 and the ball attachment 28, in particular close to its transition to the ball attachment 28.

For pressing the fixing fingers 222 against the named position of the ball surface 38, the fixing fingers 222 comprise obliquely extending outside surfaces 226, on which a wedge ring surface 228 of an actuating body 232 acts.

The actuating body 232 is preferably realized as a ring body which comprises an internal thread 234 which engages in an external thread 236 of the housing body 84''''.

The outside surfaces 226 of the fixing fingers 222, and the actuating body 232 with the wedge ring surface 228 and the internal thread 234 and the external thread 246 form an actuating device 240.

As a result of twisting the actuating body 232, it is now possible to displace the wedge ring surface 228 relative to the oblique outside surfaces 226 of the fixing fingers 222 such that they either allow a movement of the fixing fingers 222 radially to the centre axis of the coupling ball 26 and consequently away from the ball surface 38 in order to be able to place the load carrier holding device 50 onto the coupling ball 26 and the ball neck 12, the position receiving elements 104 resting on the positioning bodies 54.

However, twisting the actuating body 232 also allows the oblique outside surfaces 224 of the fixing fingers 222 to be acted upon with the wedge ring surface 228 in such a manner that they move radially inward, and abut against the ball surface 38 close to the transition to the ball attachment 28 in particular with their end surfaces 224.

As a result, the load carrier holding device 50 is acted upon with a force parallel to the loading direction and consequently the load carrier holding device 50 is fixed to the coupling ball 26 and the ball neck 12.

Figure 19:
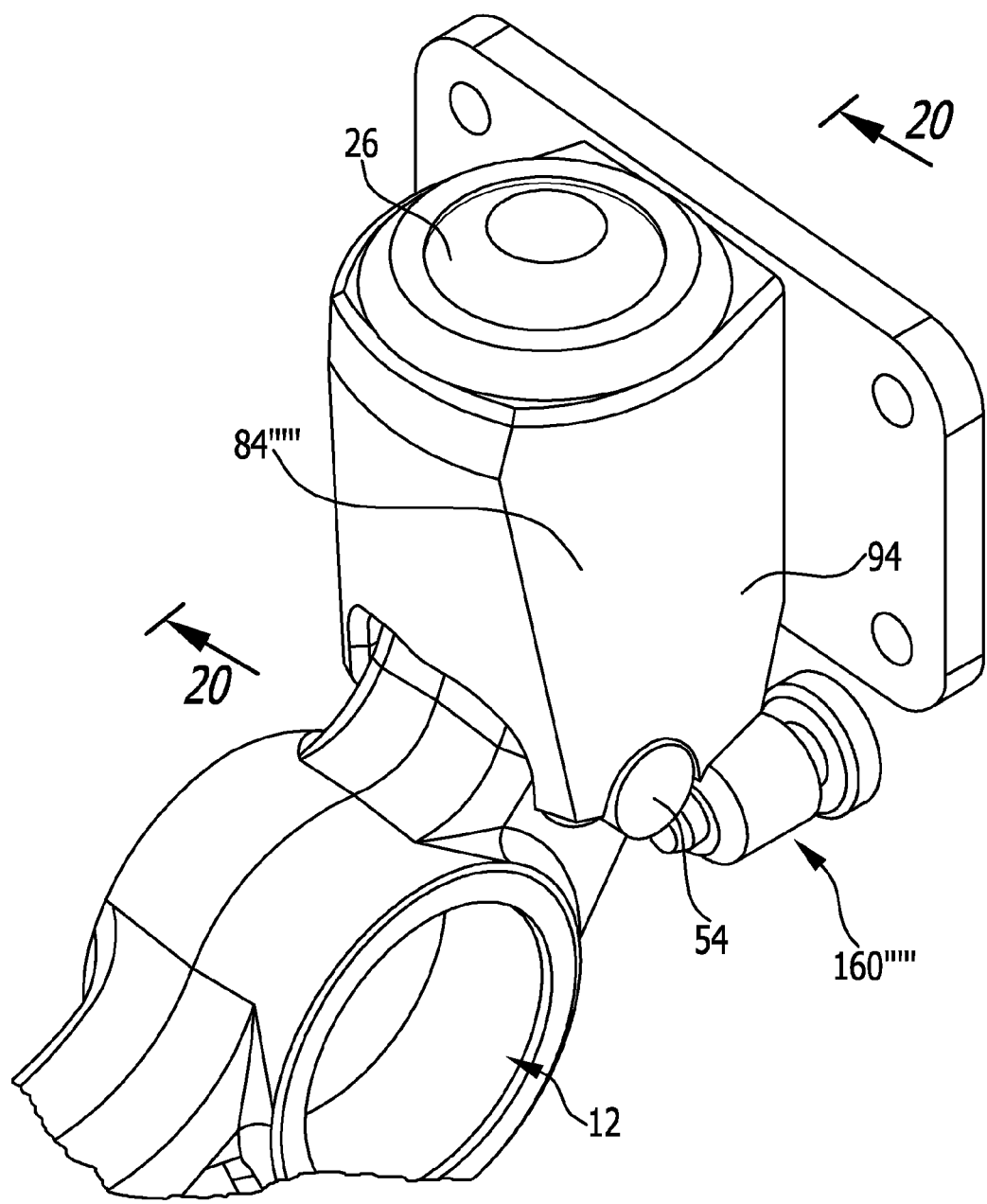
FIG. 19 shows a perspective representation of an eighth embodiment of the load carrier holding device with a sixth realization of the fixing device according to the invention.
Figure 20:
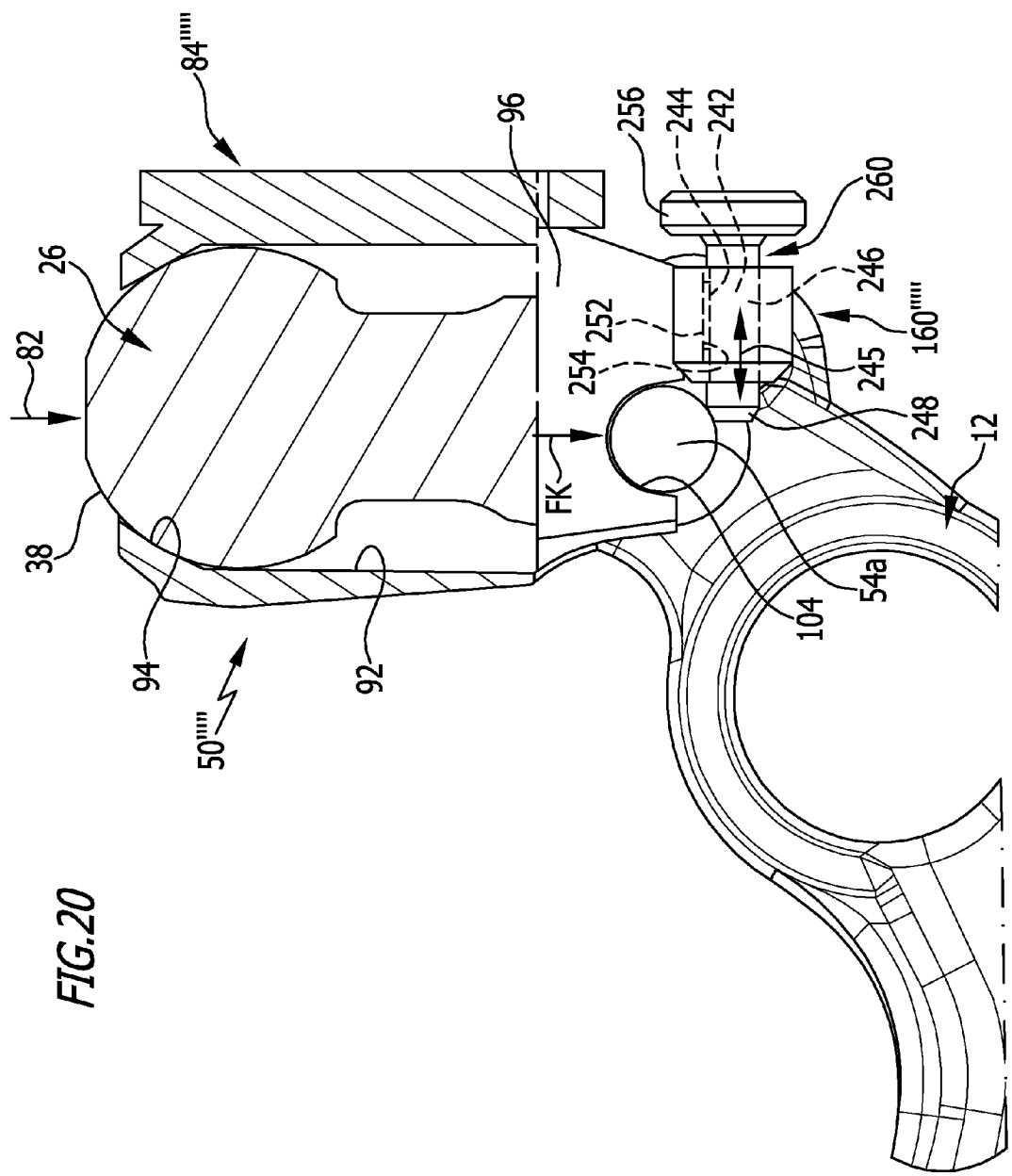
FIG. 20 shows a section along the line 20-20 in FIG. 19.

In the case of a sixth realization of a fixing device 160'''' according to the invention, integrated into an eighth embodiment of the load carrier holding device and shown in FIGS. 19 and 20, in each case on the holding elements 96 a fixing journal 242 is provided as a fixing element which is arranged in a guide channel 244 and is guided in a guide direction 245 and which guide channel is realized in a bearing body 246 which is held on the respective holding element 96.

The bearing body 246 and the fixing journal 242, in this case, are dimensioned and arranged on the holding elements 96 such that the fixing journal 242 with a journal end 248 which projects beyond the bearing body 246 is capable of engaging behind the respective positioning body 54 on a side remote from the coupling ball 26 and of acting upon it and as a result of exerting a force onto the housing body 84'''' which acts upon said housing body in the loading direction 82.

In the case of said exemplary embodiment, however, the housing body 84'''' is realized such that it rests on the ball surface 38 of the coupling ball 26 with an end surface 94 which connects to the ball guide surface 92 and is consequently carried by the coupling ball 26.

Consequently, the position receiving elements 104, which cooperate with the positioning bodies 54, serve simply for the purpose of holding the load carrier holding device 50""' aligned precisely relative to the ball neck 12.

For moving the fixing journal 242 relative to the bearing body 246, the fixing journals 242 are provided with an external thread 252 which engages into an internal thread 254 of the guide channel such that the two threads 252 and 254 provide a threaded guide which allows the journal to be displaced when said journal is rotated by means of an actuating element 256.

Consequently the threads 252 and 254 with the actuating element 256 form an actuating device 260 for moving the fixing element 242.

Figure 21:
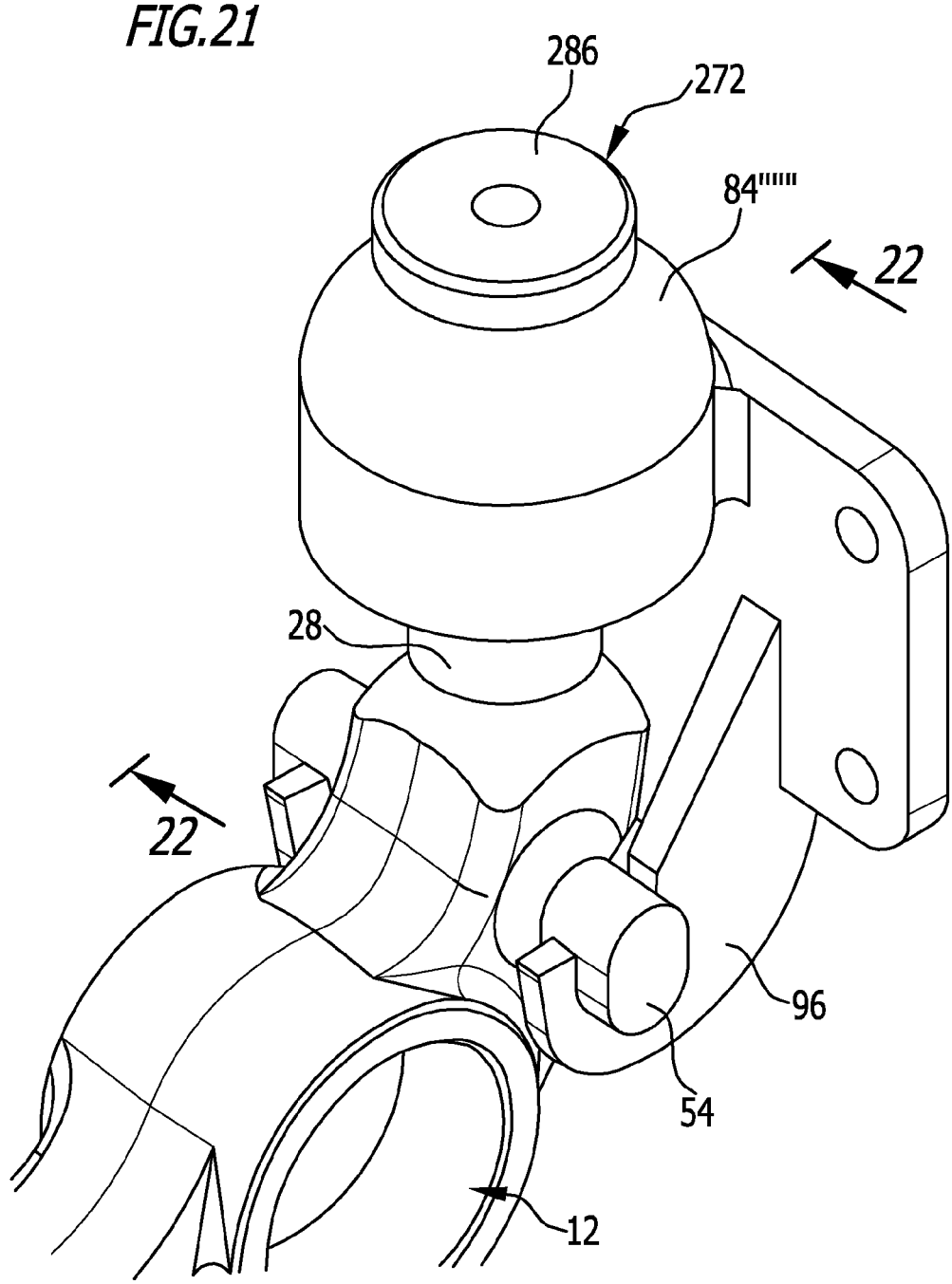
FIG. 21 shows a perspective representation of a sixth exemplary embodiment of the ball neck with a ninth embodiment of the load carrier holding device and a seventh realization of the fixing device according to the invention.
Figure 22:
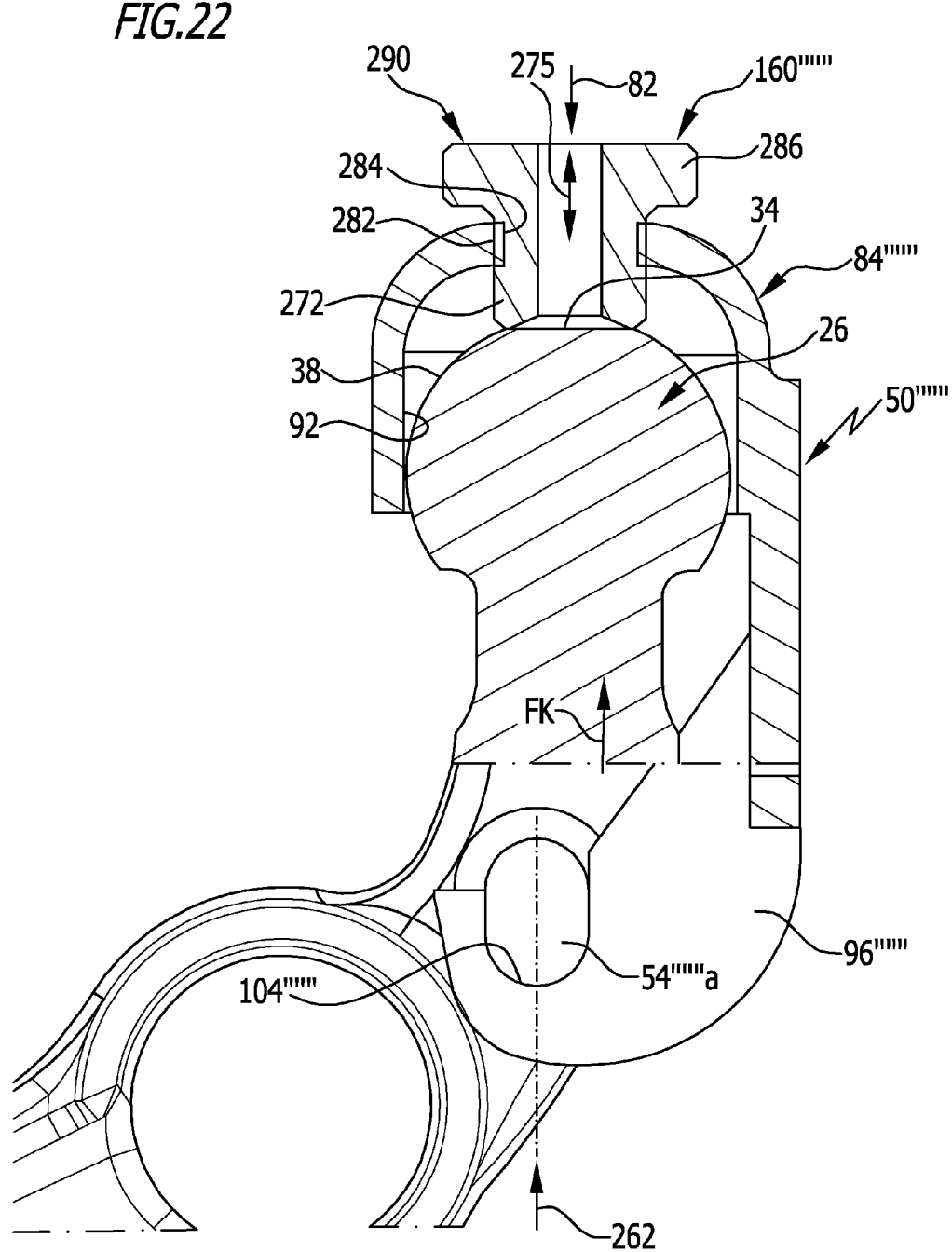
FIG. 22 shows a section along the line 22-22 in FIG. 21.

In the case of a seventh realization of the fixing device 160""' and a ninth embodiment of the load carrier holding device, shown in FIGS. 21 and 22, the housing body 84""' is realized such that it engages over the coupling ball 26 and with the ball guide surface 92 abuts against the ball surface 38 of the coupling ball 26.

In addition, the holding elements 96""' are realized such that they abut against the fixing bodies 54""' such that the position receiving elements 104 can be moved in the direction of a loading direction 82""' which is directed onto the coupling ball 26, the position receiving elements 104""' engaging over the positioning bodies 54""'a on a side remote from the coupling ball and cooperating with the same.

In this case, the housing body 84""' is realized such that it can be placed so far onto the coupling ball 26 that the position receiving elements 104 of the holding elements 96 are able be suspended on the positioning bodies 54 by engaging behind said positioning bodies 54 on a side remote from the coupling ball 22 in order to be secured in a positive locking manner on said positioning bodies.

For fixing the load carrier holding device 50, proceeding from the position receiving elements 104 engaging behind the positioning bodies 54, it is necessary to move the position receiving elements 104""' with the holding element 96""' and the housing body 84""' in opposition to the loading direction 82 in the fixing direction 262 such that the positioning elements 54""' are able to enter into the position receiving elements 104""'.

To this end, for forming the fixing device 160""' in the housing body 84""', a pressing element 272 is provided as the fixing element which is movable in a guided manner in a guide direction 175 and acts on the coupling ball 26 in the region of its flattening 34 in order to be able to move the housing body 84 in the fixing direction 262 in opposition to the loading direction 82.

The pressing element 272 includes, for example, an external thread 282, which engages into an internal thread 284 of an opening which penetrates the housing body 84, and is coupled with an actuating element 286, the actuating element 286 forming with the external thread 282 and the internal thread 284 an actuating device 290.

As a result of rotating the pressure element 272, for example by means of an actuating element 286, it is possible to move the load carrier holding device 50""' in the fixing direction 262 and to hold it as a result of the pressure element 272 being supported on the coupling ball 26 and the entire unit produced from the housing body 84""', the holding elements 96""' and the position receiving elements 104""' moving in the fixing direction 262 until the position receiving elements 104, acted upon by force, abut against the fixing bodies 54.

Over and above this, the housing body 84""' is fixed in a known manner by the cylindrical ball guide surface 92 which abuts against the ball surface 38 of the coupling ball 26.

In the case of an eighth realization of a fixing device 160""' integrated into a tenth embodiment of a load carrier holding device 50""', said load carrier holding device is modified in such a manner that the housing body 84""' rests on the ball surface 38 of the coupling ball 26.

The fixing device 160""' includes a fixing body 292 as a fixing element which is movable by means of a toggle lever device 294 as an actuating device in the direction of the ball surface 38 of the coupling ball 26 or is movable away from said ball surface.

The fixing body 292, in this case, preferably abuts against the ball surface 38 in the region of a transition of the same to the ball attachment 28 in order to secure the load carrier holding device 50""' on the coupling ball 26.

Figure 23:
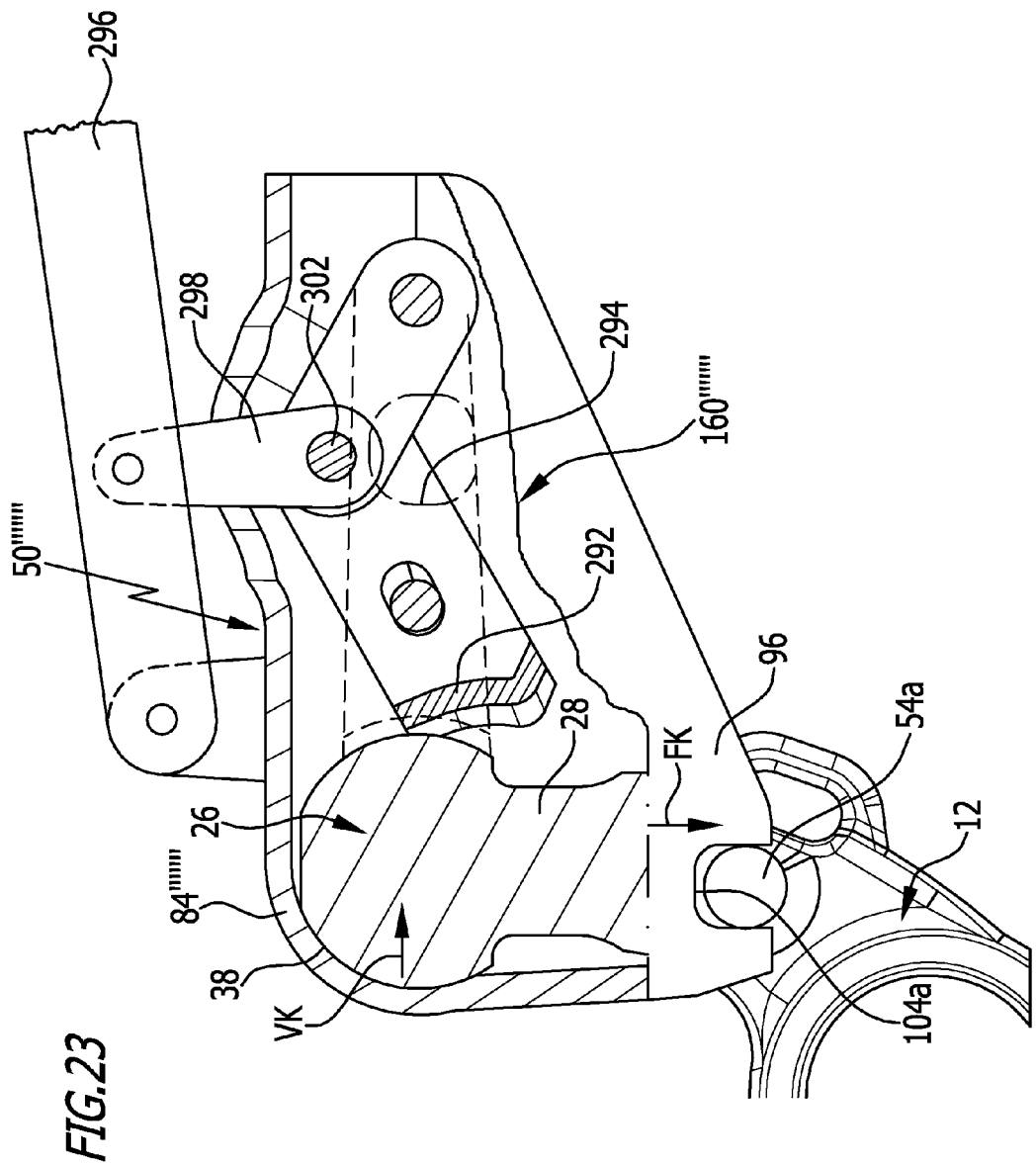
FIG. 23 shows a longitudinal section through the first exemplary embodiment of the ball neck with a tenth embodiment of the load carrier holding device and an eighth realization of the fixing device according to the invention.

For securing the fixing body 292, the toggle lever device 294 is movable into an above dead centre position, shown by the broken line in FIG. 23, in which said toggle lever device presses the fixing element 292 against the ball surface 38 of the coupling ball 26.

If the toggle lever device 294 is moved into a bent position, as shown in FIG. 23, the fixing body 292 is at a spacing from the ball surface 38 of the coupling ball 26 and enables the load carrier holding device 50""' to be removed from the coupling ball 26 and the ball neck 12.

The toggle lever device 294 is actuated by an actuating lever 296 which acts on a toggle joint 302 of the toggle lever device by means of an intermediate lever 298 in order to move said toggle joint either into the bent-through position or into the above dead centre position shown by the broken line in FIG. 23.

The invention claimed is:

1. A trailer coupling for motor vehicles, including a ball neck which is mountable on a rear part of a motor vehicle so as to be fixed to the vehicle by means of a ball neck carrier by way of a first end and on a second end carries a coupling ball, for positioning a load carrier holding device, which is loadable onto the coupling ball and the ball neck, comprising: two first positioning bodies that are arranged on the ball neck at a defined spacing from the coupling ball, each first positioning body is arranged on a ball neck portion of the ball neck which adjoins a ball attachment of the ball neck which carries the coupling ball and in particular, proceeding from the ball attachment, extends along the ball neck over a distance which corresponds to a maximum of one and a half times the diameter of the coupling ball, the two first positioning bodies extending transversely with respect to a section of the ball neck portion which carries said positioning bodies and away from said ball neck portion, each first positioning body carries at least one first positioning surface, and the at least one first positioning surface is arranged on an outside surface of each positioning body, and wherein the at least one first positioning surface lies outside a projection contour of the coupling ball which is generated as a result of the projection of the coupling ball onto the first positioning bodies, wherein in particular the projection contour intersects the first positioning bodies.

2. The trailer coupling according to claim 1, wherein the at least one first positioning surface comprises at least one guide surface region which runs parallel to a loading direction of the load carrier holding device.

3. The trailer coupling according to claim 1, wherein the two first positioning bodies are arranged in each case on the ball neck portion on oppositely located sides of said ball neck portion, the first positioning bodies are arranged on oppositely situated sides of a longitudinal center plane of the ball neck and the first positioning bodies are arranged in a mirror-symmetrical manner to the longitudinal center plane of the ball neck.

4. The trailer coupling according to claim 3, wherein at least one first positioning surface comprises at least one positioning surface region which runs transversely with respect to a loading direction.

5. The trailer coupling according to claim 1, wherein the at least one first positioning surface is a surface region of a geometrical surface which intersects the ball neck portion carrying the positioning bodies.

6. The trailer coupling according to claim 1, wherein each first positioning body comprises first positioning surfaces which are arranged on oppositely situated sides.

7. The trailer coupling according to claim 1, wherein at least one second positioning surface, which runs transversely with respect to the first positioning surface, is arranged on the ball neck.

8. The trailer coupling according to claim 7, wherein the at least one second positioning surface is arranged on the ball neck portion of the ball neck which adjoins a ball attachment of the ball neck carrying the coupling ball and in particular carries the first positioning bodies.

9. The trailer coupling according to claim 7, wherein the at least one second positioning surface is arranged on the first positioning bodies.

10. The trailer coupling according to claim 7, wherein the at least one second positioning surface is arranged on a second positioning body.

11. The trailer coupling according to claim 7, wherein the at least one second positioning surface lies outside of a projection contour of the coupling ball which is generated as a result of the projection of the coupling ball onto the positioning bodies carrying said at least one second positioning surface.

12. The trailer coupling according to claim 7, wherein the at least one second positioning surface lies inside of a projection contour of the coupling ball which is generated as a result of the projection of the coupling ball onto the positioning bodies carrying the at least one second positioning surface.

13. A load carrier holding device for a trailer coupling which comprises a ball neck and a coupling ball, in particular for a trailer coupling according to claim 1, said load carrier holding device including a housing body with a ball receiving means for the coupling ball of the ball neck of the trailer coupling and at least one position receiving element which is fixedly connected to the housing body, each position receiving element interacting with one of the first positioning bodies which are arranged on the ball neck.

14. The load carrier holding device according to claim 13, wherein the position receiving elements interact with the first positioning bodies in such a manner, in particular so as to form a positive-locking fit, that the housing body is secured relative to the ball neck against tilting movements about tilt axes which extend transversely, in particular perpendicularly, with respect to the centre axis of the coupling ball.

15. The load carrier holding device according to claim 13, wherein each first positioning body and each position receiving element interact in such a manner, in particular so as to form a positive-locking fit, that the housing body is secured in a non-rotatable manner against a rotational movement about a rotational axis which is parallel to the centre axis of the coupling ball or encloses a maximum angle of 20° with the centre axis of the coupling ball.

16. The load carrier holding device according to claim 15, wherein each position receiving element interacts in a clamping-free manner with one of the first positioning bodies.

17. The load carrier holding device according to claim 13, wherein two position receiving elements are fixedly connected to the housing body, the two position receiving elements are arranged in a rigid manner relative to one another.

18. The load carrier holding device according to claim 13, wherein the two position receiving elements are arranged rigidly relative to the housing body.

19. A load carrier holding device for a trailer coupling which comprises a ball neck and a coupling ball, in particular for a trailer coupling including a ball neck which is mountable on a rear part of a motor vehicle so as to be fixed to the vehicle by means of a ball neck carrier by way of a first end and on a second end carries a coupling ball, for positioning a load carrier holding device, which is loadable onto the coupling ball and the ball neck, comprising: two first positioning bodies that are arranged on the ball neck at a defined spacing from the coupling ball, each first positioning body is arranged on a ball neck portion of the ball neck which adjoins a ball attachment of the ball neck which carries the coupling ball and in particular, proceeding from the ball attachment, extends along the ball neck over a distance which corresponds to a maximum of one and a half times the diameter of the coupling ball, the two first positioning bodies extending transversely with respect to a section of the ball neck portion which carries said positioning bodies and away from said ball neck portion, each first positioning body carries at least one first positioning surface, and the at least one first positioning surface is arranged on an outside surface of each positioning body, said load carrier holding device including a housing body with a ball receiving means for the coupling ball of the ball neck of the trailer coupling and at least one position receiving element which is fixedly connected to the housing body, each position receiving element interacting with one of the first positioning bodies which are arranged on the ball neck, wherein each position receiving element comprises two receiving surfaces which face one another, the respective first positioning body is arranged in a load carrier holding position within its region carrying the at least one first positioning surface between the receiving surfaces of the at least one position receiving element.

20. A load carrier holding device for a trailer coupling which comprises a ball neck and a coupling ball, in particular for a trailer coupling including a ball neck which is mountable on a rear part of a motor vehicle so as to be fixed to the vehicle by means of a ball neck carrier by way of a first end and on a second end carries a coupling ball, for positioning the load carrier holding device, which is loadable onto the coupling ball and the ball neck, comprising: two first positioning bodies that are arranged on the ball neck at a defined spacing from the coupling ball, each first positioning body is arranged on a ball neck portion of the ball neck which adjoins a ball attachment of the ball neck which carries the coupling ball and in particular, proceeding from the ball attachment, extends along the ball neck over a distance which corresponds to a maximum of one and a half times the diameter of the coupling ball, the two first positioning bodies extending transversely with respect to a section of the ball neck portion which carries said positioning bodies and away from said ball neck portion, each first positioning body carries at least one first positioning surface, and the at least one first positioning surface is arranged on an outside surface of each positioning body, said load carrier holding device including a housing body with a ball receiving means for the coupling ball of the ball neck of the trailer coupling and at least one position receiving element which is fixedly connected to the housing body, each position receiving element interacting with one of the first positioning bodies which are arranged on the ball neck, wherein the at least one position receiving element comprises receiving surfaces which extend facing one another, between which a respective one of the first positioning bodies is arranged in the load carrier holding position.

21. The load carrier holding device according to claim 20, wherein the receiving surfaces comprise guide surface regions which face one another and extend approximately parallel to the loading direction.

22. The load carrier holding device according to claim 20, wherein at least one of the receiving surfaces comprises a support surface region which extends transversely with respect to the loading direction.

23. The load carrier holding device according to claim 13, wherein the load carrier holding device comprises a fixing device which secures the housing body on the ball neck, and the fixing device comprises a fixing element which fixes the housing body relative to the ball neck in the load carrier holding position.

24. The load carrier holding device according to claim 23, wherein the fixing element interacts with the coupling ball or the ball neck in such a manner that the housing body is acted upon with a fixing force in the loading direction or counter to said loading direction relative to the coupling ball or to the ball neck.

25. The load carrier holding device according to claim 23, wherein the fixing element interacts with the coupling ball or the ball neck in such a manner that the housing body experiences a clamping force which is directed transversely with respect to the loading direction relative to the coupling ball or to the ball neck.

26. The load carrier holding device according to claim 23, wherein the fixing element cooperates with the ball neck or with the positioning body or with the coupling ball in a fixing position, and the fixing element is movable in a guide direction between a release position and a fixing position and in that the fixing element is movable in the guide direction as a result of an actuating device.

27. The load carrier holding device according to claim 26, wherein the fixing element projects into the ball receiving means of the housing body in the fixing position.

28. The load carrier holding device according to claim 26, wherein the fixing element is guided so as to be movable in a guide channel between the fixing position and the release position, and the guide channel runs transversely with respect to the ball receiving means.

29. The load carrier holding device according to claim 28, wherein the actuating device comprises a threaded drive for moving the fixing element between the release position and the fixing position.

\* \* \* \* \*